(12) United States Patent
Youn et al.

(10) Patent No.: US 11,463,979 B2
(45) Date of Patent: *Oct. 4, 2022

(54) METHOD AND USER EQUIPMENT FOR INITIATING SERVICE REQUEST PROCEDURE

(71) Applicant: LG Electronics Inc., Seoul (KR)

(72) Inventors: Myungjune Youn, Seoul (KR); Laeyoung Kim, Seoul (KR); Jaehyun Kim, Seoul (KR); Hyunsook Kim, Seoul (KR); Jinsook Ryu, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 70 days.

This patent is subject to a terminal disclaimer.

(21) Appl. No.: 17/090,567

(22) Filed: Nov. 5, 2020

(65) Prior Publication Data

US 2021/0058886 A1 Feb. 25, 2021

Related U.S. Application Data

(63) Continuation of application No. 16/875,316, filed on May 15, 2020, now Pat. No. 10,880,852, which is a
(Continued)

(51) Int. Cl.
*H04W 4/00* (2018.01)
*H04W 60/00* (2009.01)
(Continued)

(52) U.S. Cl.
CPC ..... *H04W 60/005* (2013.01); *H04W 36/0027* (2013.01); *H04W 68/02* (2013.01)

(58) Field of Classification Search
None
See application file for complete search history.

(56) References Cited

U.S. PATENT DOCUMENTS

2018/0376444 A1* 12/2018 Kim .................. H04W 74/0833
2019/0007992 A1 1/2019 Kim et al.
(Continued)

FOREIGN PATENT DOCUMENTS

| KR | 20160140916 | 12/2016 |
| WO | 2017142362 | 8/2017 |
| WO | WO2019160300 | 8/2019 |

OTHER PUBLICATIONS

Notice of Allowance in European Appln. No. 18878583.6, dated Sep. 22, 2021, 7 pages.
(Continued)

*Primary Examiner* — Clemence S Han
(74) *Attorney, Agent, or Firm* — Fish & Richardson P.C.

(57) ABSTRACT

A disclosure in the present specification provides a method for user equipment initiating a service request procedure. The method includes a step of the UE receiving a paging message. The UE may be registered to both of a 3rd generation partnership project (3GPP) access and a non-3GPP access within the same PLMN. The paging message may include access type information that is used so as to indicate the non-3GPP access. The method may include a step of initiating a UE triggered service request procedure. The UE triggered service request procedure may be initiated by transmitting a service request message including a list of permitted protocol data unit (PDU) sessions. The service request message may include an empty list of the permitted PDU sessions if there is no PDU sessions that can be reactivated in the 3GPP access.

9 Claims, 12 Drawing Sheets

Related U.S. Application Data continuation of application No. PCT/KR2018/013798, filed on Nov. 13, 2018.

(60) Provisional application No. 62/587,477, filed on Nov. 17, 2017, provisional application No. 62/610,518, filed on Dec. 27, 2017, provisional application No. 62/617,610, filed on Jan. 16, 2018, provisional application No. 62/628,239, filed on Feb. 8, 2018, provisional application No. 62/629,696, filed on Feb. 13, 2018, provisional application No. 62/629,705, filed on Feb. 13, 2018.

(51) Int. Cl.
*H04W 36/00* (2009.01)
*H04W 68/02* (2009.01)

(56) References Cited

U.S. PATENT DOCUMENTS

| | | | | |
|---|---|---|---|---|
| 2019/0075511 | A1* | 3/2019 | Ryu | H04W 4/16 |
| 2019/0116631 | A1* | 4/2019 | Talebi Fard | H04W 76/11 |
| 2020/0015309 | A1* | 1/2020 | Li | H04W 68/005 |
| 2020/0021970 | A1* | 1/2020 | Lu | H04W 68/04 |
| 2020/0077356 | A1* | 3/2020 | Youn | H04W 76/27 |
| 2020/0100101 | A1* | 3/2020 | Torvinen | H04L 63/0428 |
| 2020/0145953 | A1* | 5/2020 | Youn | H04W 60/04 |
| 2020/0170068 | A1* | 5/2020 | Thiebaut | H04W 4/14 |
| 2020/0178196 | A1* | 6/2020 | Wang | H04W 48/18 |
| 2020/0337093 | A1* | 10/2020 | Kim | H04W 76/10 |

OTHER PUBLICATIONS

3rd Generation Partnership Project Technical Specification Group Services and System Aspects, "Procedures for the 5G System; Stage 2 (Release 15)," 3GPP TS 23.502 V1.2.0, Sep. 2017, 165 pages.

3rd Generation Partnership Project Technical Specification Group Services and System Aspects, Procedures for the 5G System Stage 2 (Release 15), 3GPP TS 23.502 V1.3.0, Nov. 2017, 217 pages.

Huawei, HiSilicon, "UE_initiated Service Request procedure via untrusted non-3GPP," S2-176217, 3GPP TSG SA WG2 Meeting #122bis, Aug. 21-15, 2017, Sophia Antipolis, France, 2 pages.

Samsung, "TS 23.502: Updates to Service Request in CM-IDLE state," S2-176109, SA WG2 Meeting #122Bis, Aug. 21-25, 2017, Sophia Antipolis, France, 7 pages.

EP extended European search report, in European Appln. No. 18878583.6, dated Nov. 10, 2020, 11 pages.

LG Electronics, "TS 23.502: Clarification on Service Request procedures," S2-174812, SA WG2 Meeting #122, San Jose del Cabo, Mexico, dated Jun. 26-30, 2017, 13 pages.

LG Electronics, "TS 23.502: Service operation between AMF and SMF (N11 messages) during NW triggered Service Request procedure," S2-177356, SA WG2 Meeting #123, Ljubljana, Slovenia, dated Oct. 23-27, 2017, 6 pages.

Samsung, SK Telecom, ZTE, "TS 23.502: NAS notification to initiate a Service Request procedure," S2-177726, SA WG2 Meeting #123, Ljubljana, Slovenia, dated Oct. 23-27, 2017, 15 pages.

* cited by examiner

METHOD AND USER EQUIPMENT FOR INITIATING SERVICE REQUEST PROCEDURE

CROSS-REFERENCE TO RELATED APPLICATION

This application is a continuation of U.S. application Ser. No. 16/875,316, filed on May 15, 2020, which is a continuation pursuant to 35 U.S.C. § 119 (e) of International Application No. P CT/KR2018/013798, filed on Nov. 13, 2018, which claims the benefit of U.S. Provisional Application Nos. 62/587,477 filed on Nov. 17, 2017, 62/610,518 filed on Dec. 27, 2017, 62/617,610 filed on Jan. 16, 2018, 62/628,239 filed on Feb. 8, 2018, 62/629,696 filed on Feb. 13, 2018 and 62/629,705 filed on Feb. 13, 2018, the contents of which are all hereby incorporated by reference herein in their entirety.

BACKGROUND OF THE DISCLOSURE

Field of the Disclosure

The present disclosure relates to a next generation mobile communication.

Related Art

In 3GPP, in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system, which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 20 and the PDN GW 53. Furthermore, if a terminal (or User Equipment (UE)) moves in a region in which service is provided by the eNodeB 20, the S-GW 52 plays a role of a local mobility anchor point. That is, for mobility within an E-UTRAN (i.e., a Universal Mobile Telecommunications System (Evolved-UMTS) Terrestrial Radio Access Network defined after the 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, and so on. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, and so on, of network resources. The MME 51 controls control plane functions related to subscribers and session management. The MME 51 manages numerous eNodeBs 20 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME. |
| S1-U | A reference point between the E-UTRAN and the S-GW for path switching between eNodeBs during handover and user plane tunneling per bearer. |

TABLE 1-continued

| REFERENCE POINT | DESCRIPTION |
| --- | --- |
| S3 | A reference point between the MME and the SGSN that provides the exchange of pieces of user and bearer information for mobility between 3GPP access networks in idle and/or activation state. This reference point can be used intra-PLMN or inter-PLMN (e.g., in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the provision of IMS services. This reference point corresponds to Gi for 3GPP access. |

<Next Generation Mobile Communication Network>

With the success of Long Term Evolution (LTE) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps in any location. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation Radio Access Network (RAN).

The Control Plane Function (CPF) node shown in FIGS. 3A and 3B may perform all or a part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

FIG. 3A is an exemplary diagram illustrating an architecture for supporting a multiple PDU session through two data networks. And, FIG. 3B is an exemplary diagram illustrating an architecture for supporting a concurrent access through two data networks.

FIG. 3A illustrates an architecture that allows a UE to simultaneously access two data networks using a multiple PDU session. Two SMFs may be selected for two different PDU sessions.

FIG. 3B illustrates an architecture that allows the UE to simultaneously access two data networks using one PDU session.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may include a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Roaming in Next Generation Mobile Communication Network>

Meanwhile, there are two schemes for handling a signaling request from the UE in a situation where the UE roams in a visited network, for example, Visited Public Land Mobile Network (VPLMN). A local break out (LBO) being a first scheme handles a signaling request from the UE by a visited network. According to a Home Routing (HR) being a second scheme, the visited network transfers a signaling request from the UE to a home network of the UE.

FIG. 4A is an exemplary diagram illustrating an architecture to which the LBO scheme is applied during roaming. And, FIG. 4B is an exemplary diagram illustrating an architecture to which an HR scheme is applied during roaming.

As shown in FIG. 4A, in an architecture to which the LBO scheme is applied, user data are transferred to a data network in a VPLMN. To this end, a PCF in the VPLMN performs interaction with an AF in order to generate a PCC rule for a service in the VPLMN. A PCF node in the VPLMN creates a PCC rule based on a policy set inside according to a roaming convention with a Home Public Land Mobile Network (HPLMN) businessman.

As shown in FIG. 4B, in the architecture to which the HR scheme is applied, data of the UE is transferred to a data network in the HPLMN.

<Data Bypass to Non-3GPP Network>

In the next generation mobile communication, the data of the UE may bypass to a non-3 GPP network, for example, a Wireless Local Area Network (WLAN) or Wi-Fi.

FIG. 5A to FIG. 5F illustrate architectures for bypassing data to the non-3GPP network.

The Wireless Local Area Network (WLAN) or Wi-Fi is regarded as the untrusted non-3GPP network. In order to access the non-3GPP network to a core network, a Non-3GPP InterWorking Function (N3IWF) may be added.

Meanwhile, if a user equipment (UE) is connected to a 3GPP access and a non-3GPP access through a same PLMN, one AMF manages both 2 accesses. The AMF may perform both the transmission of a Paging message for a 3GPP access and the transmission of a Paging message for a non-3GPP access.

If the UE receives a Paging message for a non-3GPP access, the UE is not required to send a response to the received Paging message. Accordingly, however, the network is incapable of identifying whether the UE has not responded after actually receiving a Paging message or whether the UE has not responded to the Paging message due to the absence of PDU sessions that are to be shifted (or transferred) to a 3GPP access. Therefore, there lies a problem in that the network is incapable of determining whether or not to perform retransmission of the Paging message.

SUMMARY OF THE DISCLOSURE

Technical Objects

The present disclosure has been provided in an effort to solve the above-described problems.

Technical Solutions

To achieve the foregoing purposes, the disclosure of the present specification proposes a method for initiating a service request procedure. The method may be performed by a user equipment (UE) and comprise receiving, by the UE, a paging message. The UE may be registered in both of a 3rd generation partnership project (3GPP) access and non-3GPP access in a same Public Land Mobile Network (PLMN). The paging message may include access type information used for representing the non-3GPP access. The method may also comprise initiating a UE-triggered service request procedure. The UE-triggered service request procedure may be initiated by transmitting a service request message including a list of allowed protocol data unit (PDU) sessions. When there is no PDU session which is to be reactivated over the 3GPP access, the service request message may include an empty list of the allowed PDU sessions.

The method may further comprise coding all bits of PDU session identifiers (PSIs) in the list of the allowed PDU sessions as zero (0), thereby generating the empty list of the allowed PDU sessions.

The UE may be in an idle state in both of the 3GPP access and the non-3GPP access.

The empty list of the allowed PDU sessions including no PSI may be used for an access and mobility management function (AMF) to notify a session management function (SMF) that the UE was reachable but did not accept to reactive the PDU session.

When the PDU session over the non-3GPP access is reactivated over the 3GPP access, the list of the allowed PDU sessions may include a PSI of the PDU session.

To achieve the foregoing purposes, the disclosure of the present specification proposes a user equipment (UE) for initiating a service request procedure. The UE may include a transceiver, and a processor configured to control the transceiver. The processor may receive, through the transceiver, a paging message. The UE may be registered in both of a 3rd generation partnership project (3GPP) access and non-3GPP access in a same Public Land Mobile Network (PLMN). The paging message may include access type information used for representing the non-3GPP access. The processor may initiate a UE-triggered service request procedure. The UE-triggered service request procedure may be initiated by transmitting a service request message including a list of allowed protocol data unit (PDU) sessions. When there is no PDU session which is to be reactivated over the 3GPP access, the service request message may include an empty list of the allowed PDU sessions.

Effects of the Disclosure

According to the disclosure of the present specification, the problem of the conventional technology described above may be resolved.

DESCRIPTION OF EXEMPLARY EMBODIMENTS

Figure 1:
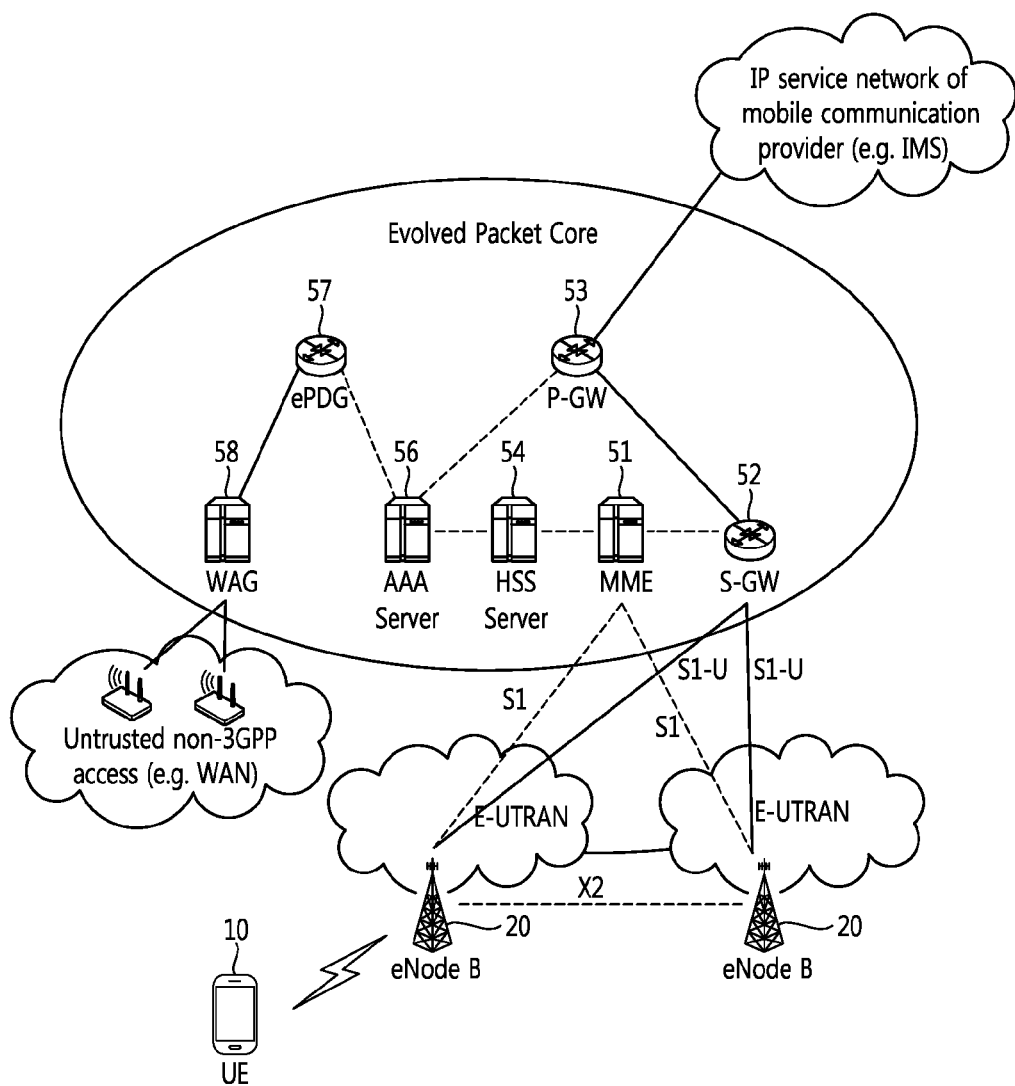
FIG. 1 shows the configuration of an evolved mobile communication network.
Figure 2:
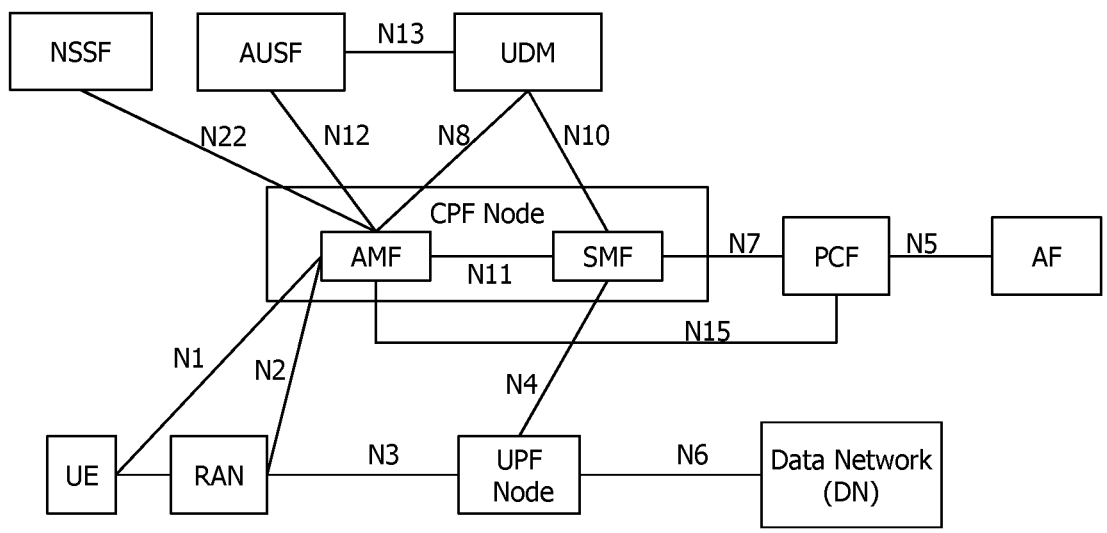
FIG. 2 is an exemplary diagram illustrating a predicted structure of a next generation mobile communication in terms of a node.
Figure 3A:
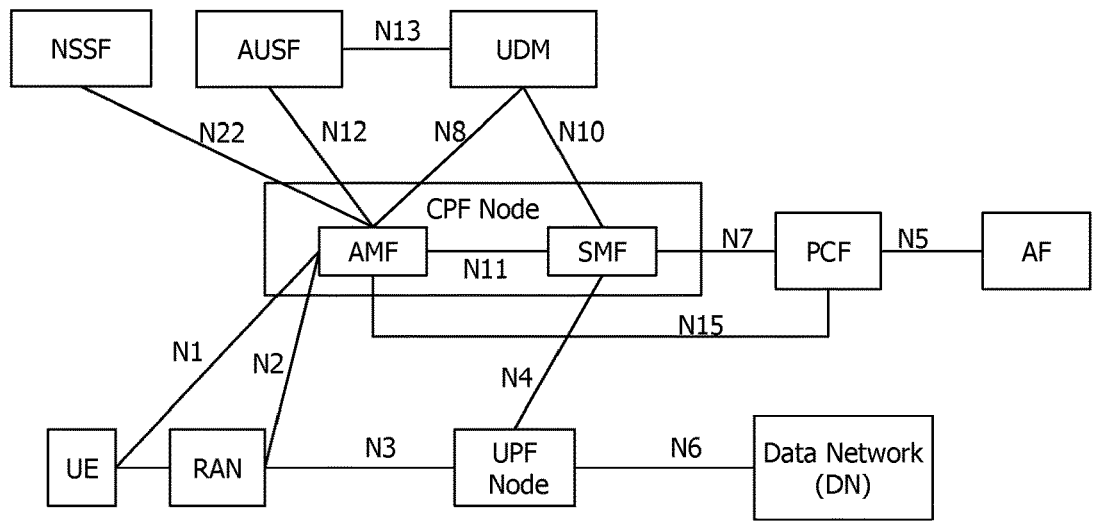
FIG. 3A is an exemplary diagram illustrating an architecture for supporting a multiple PDU session through two data networks.
Figure 3B:
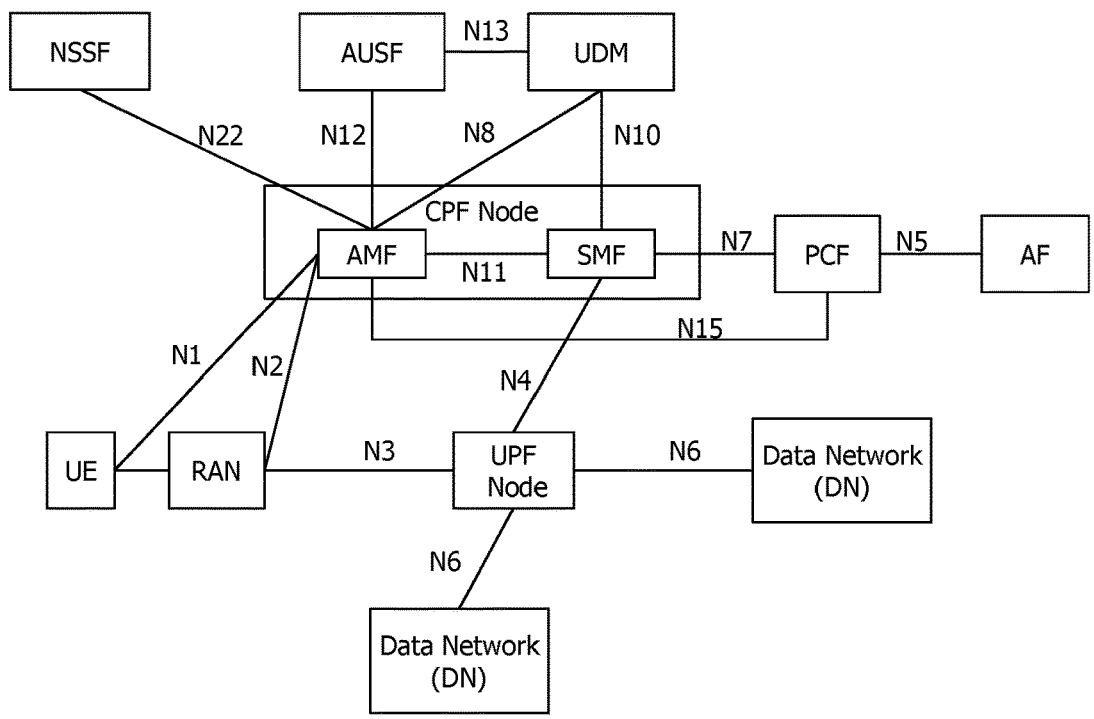
FIG. 3B is an exemplary diagram illustrating an architecture for supporting a concurrent access through two data networks.
Figure 4A:
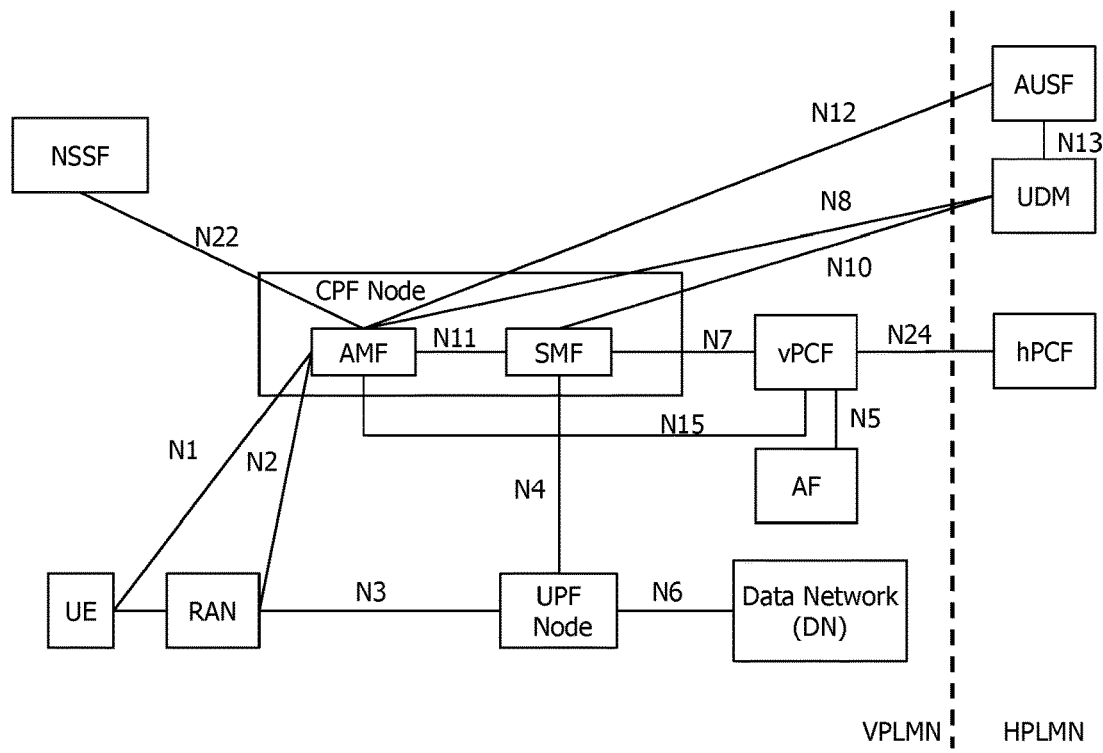
FIG. 4A is an exemplary diagram illustrating an architecture to which the LBO scheme is applied during roaming.
Figure 4B:
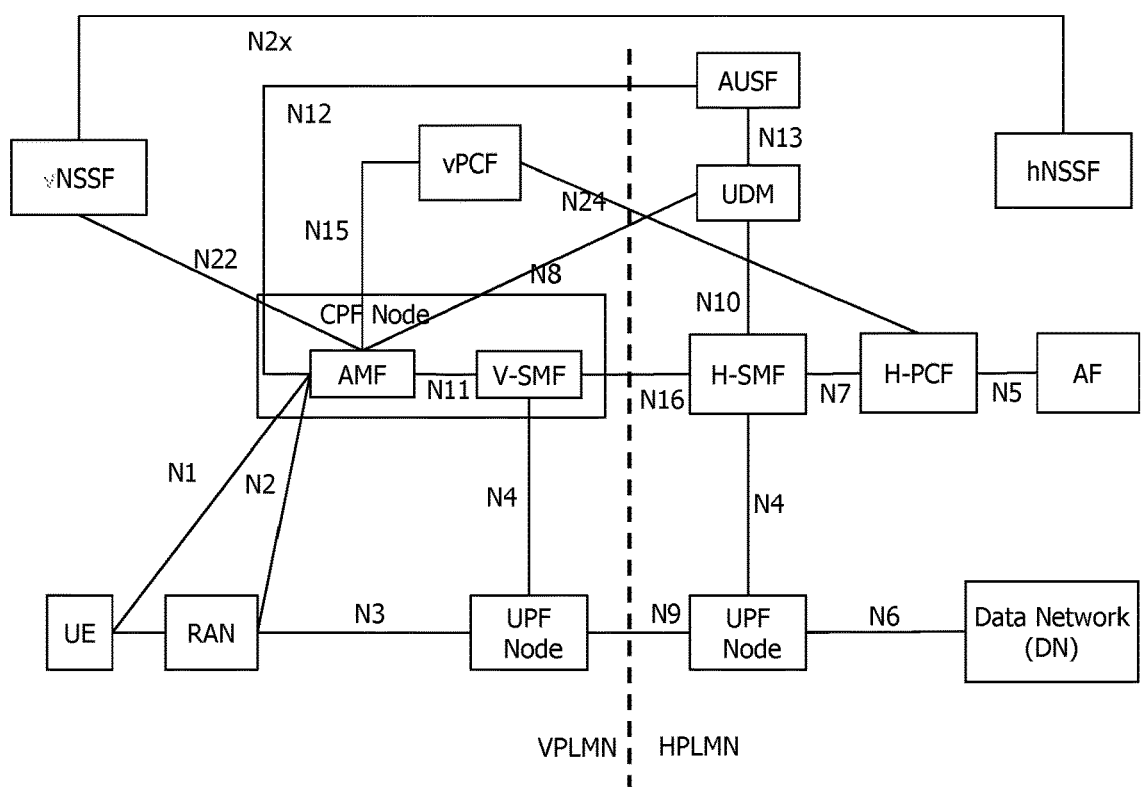
FIG. 4B is an exemplary diagram illustrating an architecture to which an HR scheme is applied during roaming.
Figure 5A:
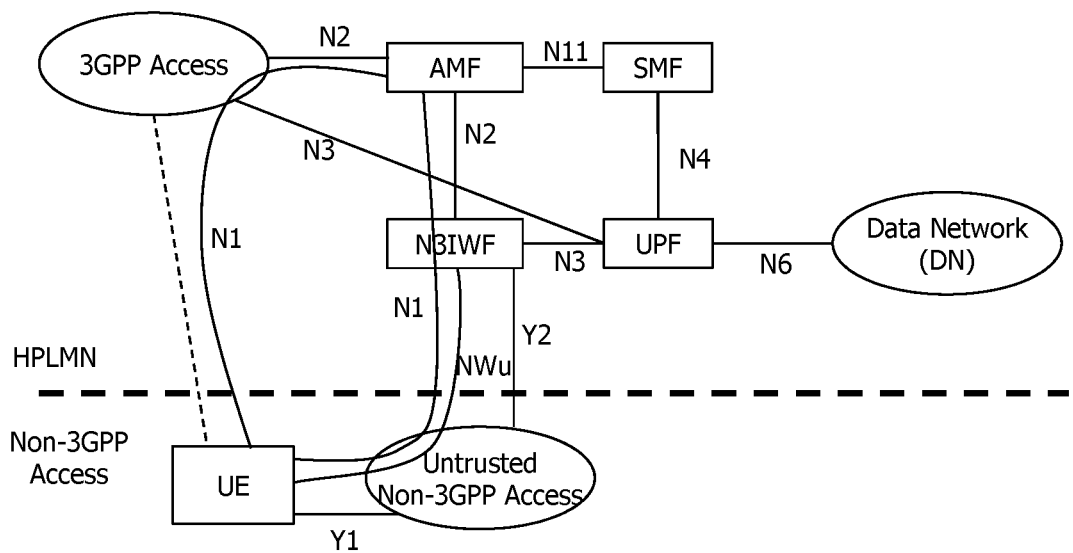
FIG. 5A to FIG. 5F illustrate architectures for bypassing data to the non-3GPP network.
Figure 5B:
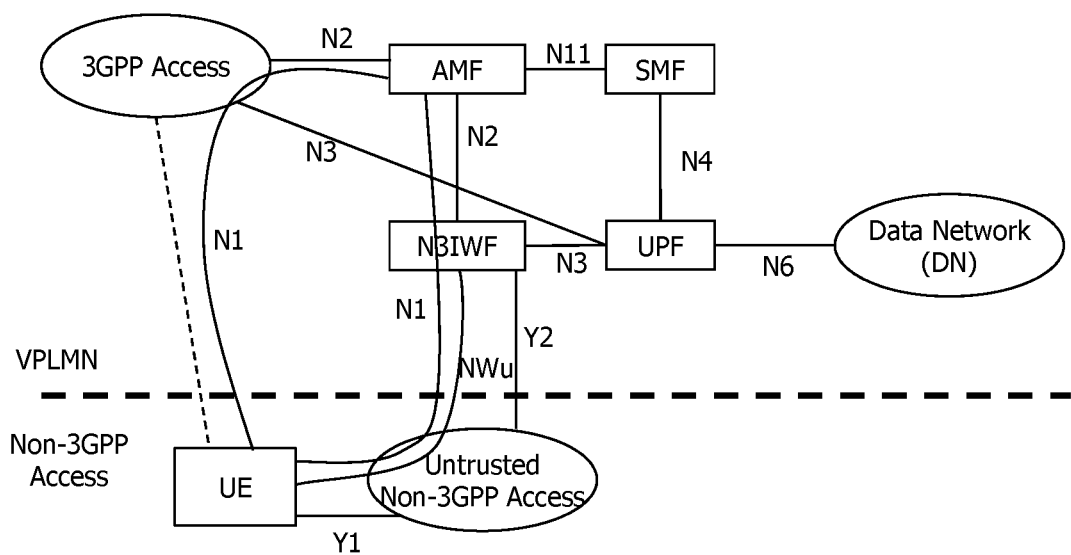
Figure 5C:
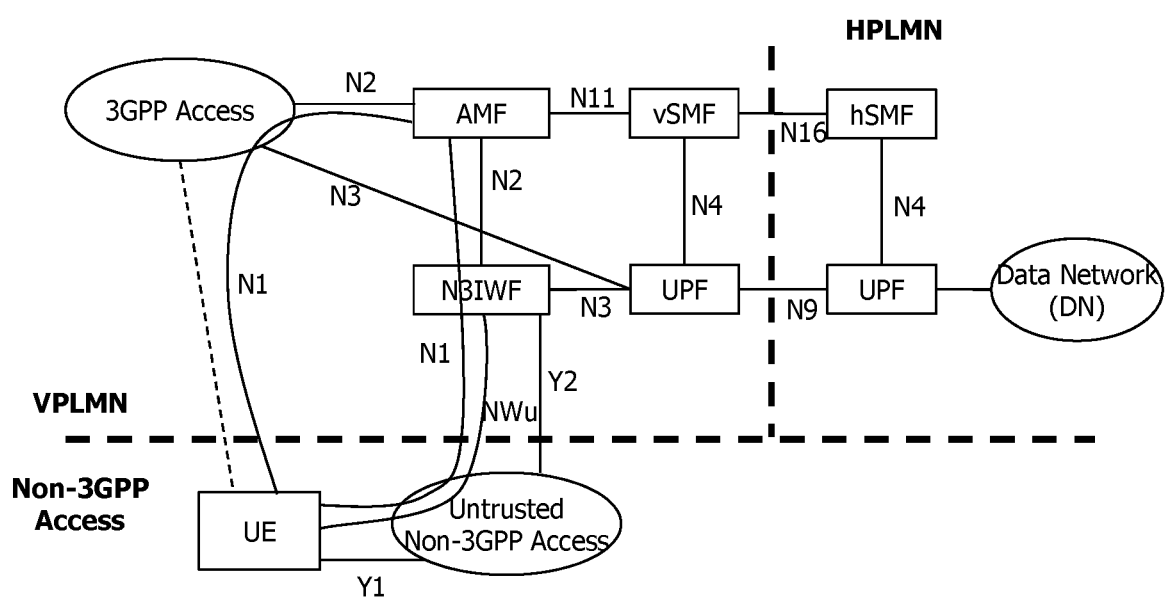
Figure 5D:
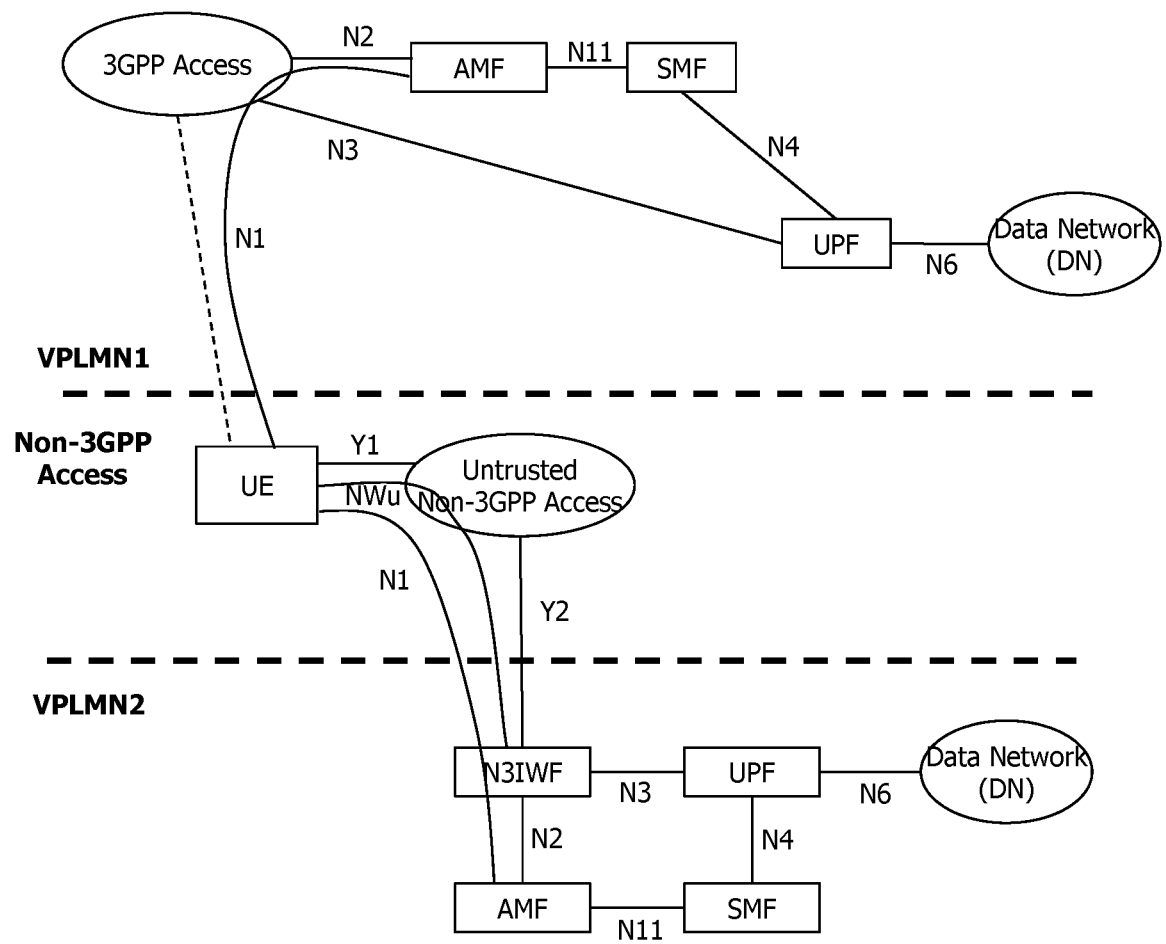
Figure 5E:
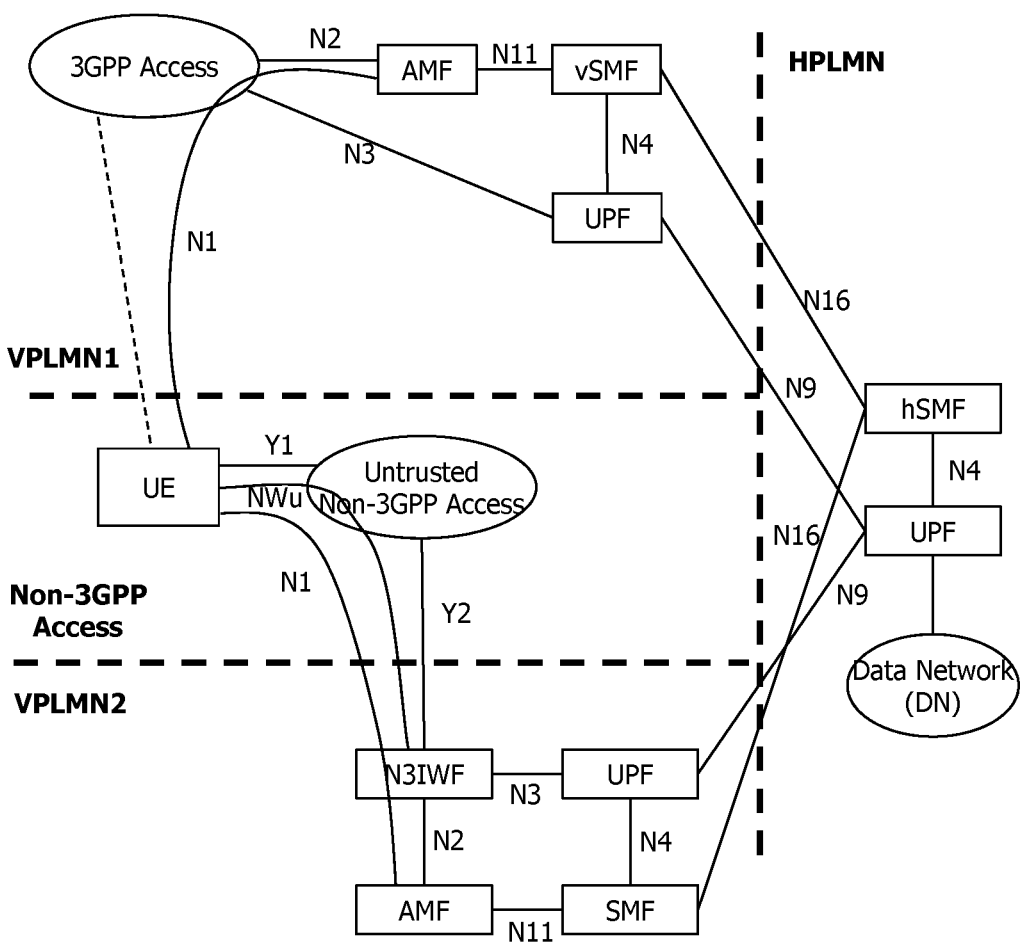
Figure 5F:
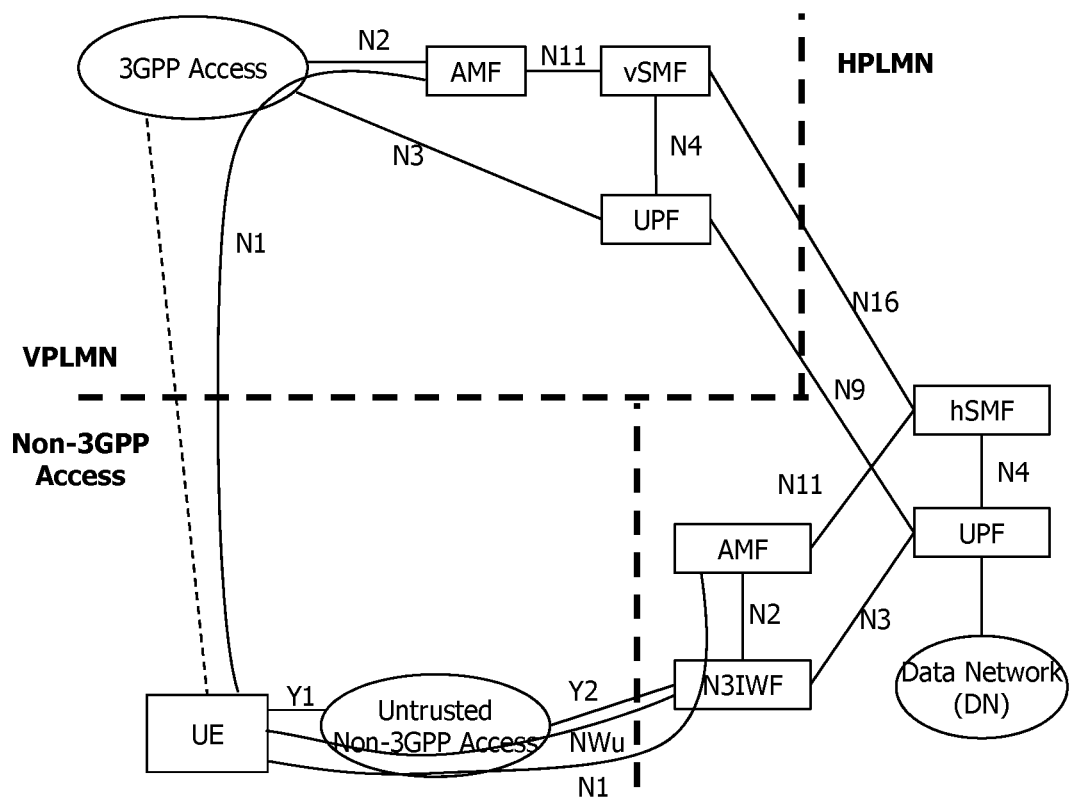

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in this specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in this specification, and may not exclude the existence or addition of another feature, another number, another step, another operation, another component, another part or the combination thereof.

The terms 'first' and 'second' are used for the purpose of explaining various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer, or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. Herein, however, the same reference numerals are used to denote the same components throughout the drawings, and repetitive description on the same components will be omitted. Additionally, in describing the present disclosure, detailed description on the related disclosed arts that are determined to cause ambiguity in the main concept of the present disclosure will be omitted. Additionally, the accompanying drawings are provided to merely facilitate the understanding of the spirit of the present disclosure, and[but] not should be intended to limit the present disclosure. It should be understood that the spirit of the present disclosure may be expanded to its modifications, replacements or equivalents in addition to what is shown in the drawings.

In the drawings, user equipments (UEs) are shown as an example. The UE may also be referred to as a terminal or mobile equipment (ME). The UE may be a laptop computer, a mobile phone, a PDA, a smartphone, a multimedia device, or other portable device, or may be a stationary device, such as a PC or a car mounted device.

Details that will hereinafter be described in this specification may be applied to a next generation (also referred to as 5th generation or 5G) mobile communication network.

<Problems to be Resolved Through the Disclosures of this Specification>

If a user equipment (UE) is connected to a 3GPP access and a non-3GPP access through a same PLMN, the two accesses are both managed by one AMF. By using this detail, in a state where both the 3GPP access and the non-3GPP access are connected to the UE by transmitting a Paging message through the 3GPP access (if the 3GPP access in an idle state), a process of relocating Protocol Data Unit (PDU) sessions existing in the non-3GPP access to the 3GPP access may be performed. Additionally, if the UE is connected to the 3GPP access, by transmitting an NAS Notification message, a process of relocating PDU sessions existing in the non-3GPP access to the 3GPP access may be performed.

Therefore, the AMF performs both the transmission of a Paging message for a 3GPP access and the transmission of a Paging message for a non-3GPP access. According to the current standard specification, in case of transmitting a Paging message for a non-3GPP access, indication/information or access type informing the paging for a non-3GPP access shall be included in the Paging message. Schemes for including indication/information indicating/informing that the paging is for a non-3GPP access in the Paging message are as described below.

A first scheme is to add 1 bit, which indicates whether the access is a 3GPP access or a non-3GPP access, in the Paging message. That is, if a bit indicating the access type is 0, this indicates that the Paging message is for a 3GPP access, and, if the corresponding bit is 1, this indicates that the Paging message is for a non-3GPP access. In case of using this method, although this method is incapable of indicating whether the Paging method is for both 3GPP access and non-3GPP access, since only 1 bit is used, this method is advantageous in that overhead of the Paging message can be reduced.

As a second scheme, 2 bits may be used to indicate whether the Paging message is a Paging message for 3GPP access, or a Paging message for non-3GPP access, or a Paging message for both 2 accesses. This scheme may deliver accurate information to the UE, thereby being capable of appropriately optimizing the operations of the UE in accordance with each situation. However, this scheme is disadvantageous in that overhead of the Paging message is increased as compared to the case of using only 1 bit.

According to the current network-initiated (or network-triggered) Service Request procedure, if the UE receives a Paging message for non-3GPP access, the UE is not required to respond to the received message. Accordingly, however, the network is incapable of identifying whether the UE has not responded after actually receiving a Paging message or whether the UE has not responded to the Paging message due to the absence of PDU sessions that are to be transferred (or shifted) to a 3GPP access. Therefore, the network is incapable of determining whether or not to perform retransmission of the Paging message. Additionally, for the AMF, in a state where a Paging message is being transmitted (or sent) through any one type of access, if a situation where the transmission of a Paging message for the other access type is needed, how the AMF is to operate is yet to be determined.

<Disclosures of this Specification>

Therefore, this specification proposes a method for supporting a scenario where transmission of a Paging message for 3GPP access and transmission of a Paging message for non-3GPP access should be performed simultaneously.

The method for efficiently performing paging in a situation where a UE is simultaneously connected to 3GPP access and non-3GPP access in a 5G system (i.e., 5G mobile communication system, next generation mobile communication system), is configured of a combination of one or more of the following operation(s)/configuration(s)/step(s).

I. First Disclosure of this Specification

I-1. First Method: Operations of a UE Receiving a Paging Message

I-1-1. First Implementation Example of the First Method

In order to indicate that a Paging message is for non-3GPP access, a situation of using the above-described first scheme (i.e., the scheme using 1 bit) will be assumed. If a UE receives a Paging message, and if 3GPP access indication and/or access type are/is included in the Paging message, a UE-initiated (or UE-triggered) service request procedure is immediately performed. If non-3GPP access indication/information and/or an access type indicating (or representing) the non-3GPP access are/is included in the Paging message, a list of allowed PDU sessions is included and transmitted in a message for performing a UE-initiated service request procedure. Herein, in the prior art, if the list of allowed PDU sessions does not exist, a service request was not required to be made. However, in case of using the above-described first scheme, the UE may include an empty list (i.e., a list in which allowed PDU sessions are not included) into a message for performing the Service Request procedure. If PDU sessions that are to be transferred to 3GPP access do not exist, the UE shall transmit (or send) the empty list when transmitting the list of allowed PDU sessions. This is because, if the transmission of a Paging message for 3GPP access and the transmission of a Paging message for non-3GPP access are simultaneously performed, indication and/or access type indicating non-3GPP access are/is included and, also, because the UE shall mandatorily perform a Paging response for 3GPP access.

Even in case of using the above-described first scheme, the UE may not perform a response to the reception of the Paging message for non-3GPP access. For this, after the AMF first performs transmission of a Paging message for non-3GPP, if transmission of a Paging message for 3GPP access is needed once again, it shall be assumed that paging is performed once again.

I-1-2. Second Implementation Example of the First Method

In order to indicate that a Paging message is for non-3GPP access, a situation of using the above-described second scheme (i.e., the scheme using 2 bits) will be assumed. If a UE receives a Paging message, and if 3GPP access indication/information and/or access type are/is included in the Paging message, a UE-initiated service request procedure is immediately performed. If non-3GPP access indication/information and/or an access type indicating the non-3GPP access are/is included in the Paging message, while performing a UE-initiated service request procedure, a list of allowed PDU sessions is included in the message and transmitted. Herein, in the prior art, if the list of allowed PDU sessions does not exist, a service request is not required to be made. If indication and/or access type indicating the 2 accesses are/is included, the UE shall include a list of allowed PDU sessions and shall mandatorily perform a Service Request procedure. At this point, if PDU sessions that are to be transferred (or shifted) to 3GPP access do not exist, the UE may either not include the list of allowed PDU sessions or transmit an empty list, in which the PDU sessions are not included.

1-2. Second Method: Operations of an AMF Transmitting a Paging Message 1-2-1. First Implementation Example of the Second Method If the AMF needs transmission of a Paging message through 3GPP access, the AMF may request transmission of a Paging message by including indication/information and/or access type indicating 3GPP access. In order to notify the Paging message that the message is for non-3GPP access, it will be assumed that the above-described first scheme (i.e., the scheme using 1 bit) is used.

If the AMF is required to additionally transmit a Paging message for non-3GPP through a 3GPP access (e.g., if downlink traffic is generated for a PDU session being associated with non-3GPP access while performing transmission of a Paging message through 3GPP access), while making a new paging request to the RAN, the AMF sends a request by including indication/information and/or access type indicating non-3GPP. Alternatively, the AMF may wait for a service request, which is sent by the UE as a response to the Paging message for 3GPP, and, then after shifting to a connected state, the AMF may send a NAS Notification message.

Conversely, if transmission of a Paging message for 3GPP access is additionally needed in a state where a Paging message has been transmitted, while including indication/information and/or access type indicating non-3GPP access (e.g., if downlink traffic is generated for a PDU session being associated with 3GPP access while performing transmission of a Paging message for non-3GPP access through the 3GPP access, or if a signal is required to be transmitted through 3GPP access while performing transmission of a Paging message for non-3GPP access), the AMF waits for a response from the UE without sending any transmission request for an additional Paging message. In this case, the UE shall always respond to the paging as described in Method 1-1.

If the UE is not required to respond to the Paging message for non-3GPP access, while using the above-described first scheme (i.e., the scheme using 1 bit), when the AMF is in a state where the transmission the Paging message for non-3GPP access has already been performed, if transmission of a Paging message for 3GPP access is needed, the AMF shall mandatorily request transmission of a new Paging message including indication/information and/or access type indicating 3GPP access. If transmission of a Paging message for non-3GPP access is needed, while being in a state where the transmission of the Paging message for 3GPP access has already been performed, the AMF waits for a response from the UE without sending any request for additional transmission of a Paging message.

1-2-2. Second Implementation Example of the Second Method

If transmission of a Paging message for 3GPP access is needed, the AMF may request paging by including indication/information and/or access type indicating 3GPP access. In order to indicate that the Paging message is for non-3GPP access, it will be assumed that the above-described second scheme (i.e., the scheme using 2 bits) is used.

If the AMF is required to additionally transmit a Paging message for non-3GPP through (e.g., if downlink traffic is generated for a PDU session being associated with non-3GPP access while performing 3GPP Paging), while making a new paging request to the RAN, the AMF sends a request by including indication/information and/or access type indicating both 2 accesses. Alternatively, the AMF may wait for a service request, which is sent by the UE as a response to the Paging for 3GPP access, and, then after shifting to an RRC CONNECTED state, the AMF may transmit a NAS Notification message.

Conversely, if transmission of a Paging message for 3GPP access is needed in a state where a Paging message has been transmitted, while including indication/information and/or access type indicating non-3GPP access (i.e., if downlink traffic is generated for a PDU session being associated with 3GPP access while performing paging for non-3GPP access, or if a signal is required to be transmitted through 3GPP access while performing paging for non-3GPP access), the AMF may transmit a Paging message after including indication/information and/or access type indicating both 2 accesses.

In case of the above-described Method 2-1 and Method 2-2, if the operations are performed in association with a paging priority, the paging priority may be applied at a higher priority level. For example, if paging for 3GPP access has been performed regardless of the paging priority or performed at a low priority level, and if paging for non-3GPP access is received at a higher priority level, a new Paging Request message for non-3GPP access may be newly transmitted regardless of the access type.

Instead of using the above-described method(s), operations may be performed by using the paging priority of the prior art. More specifically, this refers to a method of setting (or configuring) transmission priority of a Paging message for 3GPP access to a higher priority level than the paging for non-3GPP access. According to the prior art for EPS, if an MME uses a priority level, a new Paging Request message is transmitted to the RAN only in a case where the MME is required to transmit a Paging message having a higher priority than the priority level of a previously transmitted Paging message. By using such priority level, a Paging message for 3GPP access or a Paging message for both 2 accesses may be set (or configured) to a higher priority level, and a Paging message for non-3GPP access may be set to have a priority level lower than that of the 3GPP access. For example, in case of using the first scheme (i.e., the scheme using 1 bit), a Paging message for 3GPP access may be set to have a higher priority level, and a Paging message for non-3GPP access may be set to have a lower priority level. Thereafter, regardless of the access type to which the Paging message is related, the AMF may determine whether or not to transmit an additional Paging message based only on the priority level of the Paging. If a first Paging message for non-3GPP (e.g., Priority Level 5) is transmitted, whether or not to transmit a second Paging message for 3GPP (Priority Level 3) is determined based on the priority level. Herein, since the paging priority level is higher, the AMF additionally transmits paging for 3GPP access. Even in case of using the second scheme (i.e., the scheme using 2 bits), a higher priority level may be set for the paging for 3GPP access or the paging for both 2 accesses, and a lower priority level may be set for the paging for non-3GPP access.

As described above, the priority level for 3GPP access or 2 accesses may not always be set to have priority levels higher than the non-3GPP. For example, if a Wi-Fi Calling service is performed through non-3GPP access, transmission may be performed by setting the priority level for non-3GPP access to be higher than the priority level for 3GPP access or 2 accesses. Additionally, by including a priority level value in the Paging message, the UE may not respond to the Paging message having a priority level value lower than that of a specific priority level value, and the UE may respond only to the Paging message having a priority level value higher than that of the specific priority level value. Thus, by having the AMF set (or configure) an appropriate Paging message priority level value, the AMF may not respond to the Paging message for non-3GPP access and may respond to the Paging message for 3GPP access or 2 accesses.

1-3. Third Method

If paging related to 3GPP access and non-3GPP access is needed the same as in the prior art, the AMF sends a transmission request for each Paging message to the RAN. Before transmitting a Paging message to the corresponding UE, if the RAN receives Paging messages related to both 3GPP access and non-3GPP access, while performing transmission of a Paging message to the UE, the RAN may perform transmission of a Paging message after inserting (or including) access type information or indication notifying 2 accesses in the corresponding Paging message. In this case, as shown in Method 1-2, if the Paging message is for non-3GPP access or 2 accesses, the UE shall mandatorily send a response after including a list of allowed PDU sessions. In order to perform such operation, after first receiving a transmission request for a Paging message, and while waiting for an actual Paging message to be transmitted to the UE, if the base station receives once again a Paging message for the same UE, the base station does not separately process the previous (or old) Paging Message request. Instead, the base station processes the previous Paging Message request together with the Paging Message request received afterwards and performs Paging message transmission only once.

1-4. Fourth Method

The AMF and base station perform transmission of Paging messages for 3GPP access and non-3GPP access the same as in the prior art. More specifically, if transmission of a Paging message for 3GPP access is needed, the AMF sets (or configures) an access type or indication as 3GPP access and transmits the Paging message to the base station, and if transmission of a Paging message for non-3GPP access is additionally needed, the AMF sets (or configures) an access type or indication as non-3GPP access and transmits the additional Paging Message request to the base station. The base station independently processes each Paging message and then transmits each processed message. In this case, if the UE receives the paging for 3GPP access or receives the paging for both 3GPP access and non-3GPP access, the UE shall mandatorily respond to the Paging message. However, if the UE receives only the Paging message for non-3GPP access, the UE may not respond to the Paging message. In case of receiving the Paging message for both 3GPP access and non-3GPP access, when responding to the paging, for the non-3GPP access, the UE shall include the list of allowed PDU sessions in the Response message and then transmit the Response message.

According to the proposed methods that are presented above, a Paging message being transmitted to the base station, by an AMF, may include information elements (IEs) as shown below.

TABLE 2

Information element (IE)
Message Type
UE Identity Index value
Paging message identifier
Paging message DRX
CN Domain
Access type/Indication
List of TAIs
>TAI List Item
>>TAI
Paging message priority
UE Radio Capability for Paging
Assistance Data for Paging As presented above, Access type/Indication may be included in a Paging message. According to the proposed method, the Access type/Indication IE may include values of 3GPP access/non-3GPP access/2 accesses (both-access) or 3GPP/non-3GPP access. Additionally, if the Access type/Indication IE is optionally included, the request may also be interpreted as a Paging request for 3GPP access. In this case, only non-3GPP access may be used as the value for the Access type/Indication IE, or both 2 accesses of non-3GPP access and 3GPP access may be used as the value for the Access type/Indication IE.

According to the proposed methods that are presented above, a Paging message being transmitted to the UE, by the base station, may be defined as shown below.

```
- - ASN1START
Paging Message::=            SEQUENCE {
    pagingRecordList         PagingRecordList
        OPTIONAL, -- Need ON
    systemInfoModification   ENUMERATED {true}
        OPTIONAL, -- Need ON
}
PagingRecordList ::=         SEQUENCE (SIZE (1..maxPageRec)) OF
                                 P
agingRecord
PagingRecord ::=             SEQUENCE {
    ue-Identity                  PagingUE-Identity,
    access-type                  ENUMERATED
    {3GPP, non-3GPP, both-access},
    ...
}
PagingUE-Identity ::=        CHOICE {
    s-TMSI                           S-TMSI,
    imsi                             IMSI,
    ...
}
IMSI ::=                     SEQUENCE (SIZE (6..21))
OF IMSI-Digit
IMSI-Digit ::=               INTEGER (0..9)
-- ASN1STOP
```

As presented above, the Access type/Indication IE is included in a Paging message and then transmitted, and, according to the proposed method, 3GPP/non-3GPP/both-access or 3GPP/non-3GPP may be used. Additionally, the Access type/Indication IE may be optionally included. If the corresponding IE is not included, the request may be interpreted as a Paging request for 3GPP access. In this case, only non-3GPP access may be used as the value for the Access type/Indication IE, or both non-3GPP access and 3GPP access may be used as the value for the Access type/Indication IE.

II. Second Disclosure of this Specification

Based on the above-described details, an enhancement of the standard specification will be presented as described below.

Figure 6:
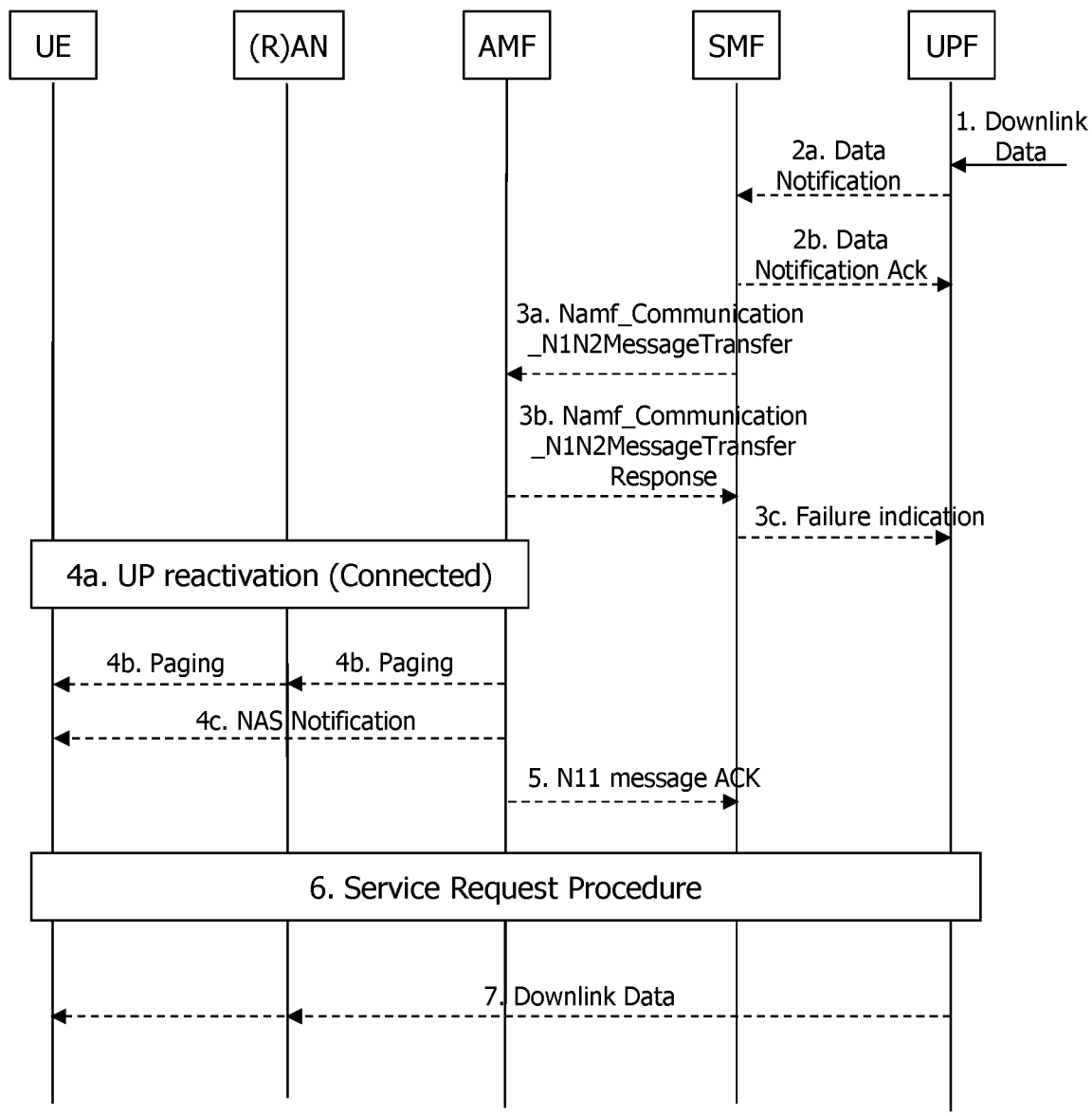
FIG. 6 is a flow chart showing a Network-triggered Service Request procedure according to a first example of a second disclosure.

II-1. First Example of the Second Disclosure: Network-Triggered Service Request Procedure This procedure is used when a network and a UE need to transmit and receive signals (e.g., user plane connection activation for PDU sessions being used for transporting (or delivering) N1 signaling, mobile terminated (MT) SMS, MT user data to a UE). When this procedure is triggered by SMSF, PCF, or UDM, the SMF of FIG. 6 is replaced with SMSF, PCF, or UDM. In 3GPP access, if a UE is in a CM-IDLE state or CM-CONNECTED state, the network initiates a network-triggered Service Request procedure. If the UE is in the CM-IDLE state, and if asynchronous type communication is not activated, the network transmits a Paging Request message to the (R)AN/UE. The Paging request triggers a UE-triggered Service Request procedure in the UE. When the asynchronous type communication activated, the network stores the received message, and, when the UE enters the CM-CONNECTED state, the network transmits the message to the (R)AN and/or UE (i.e., the (R)AN and/or UE synchronize(s) the context).

When the SMF is triggered so as to transmit a second N11 message having a higher priority level than the priority level at which a first N11 message was transmitted, the SMF transmits a new N11 message indicating a higher priority level to the AMF. If the SMF receives an additional Notification message from the UPF for a PDU session having a same priority level as the first N11 message or lower, or if the SMF transmits a second N11 message indicating a high priority level and then receives an additional Notification message from the UPF, the SMF may not transmit a new N11 message.

In non-3GPP access, if the UE is in the CM-IDLE, if the UE is simultaneously registered through 3GPP, and if the UE is connected to non-3GPP access in the same PLMN, the network may initiate a network-triggered Service Request procedure for 3GPP access through the non-3GPP access.

If the UE is in the CM-IDLE state in 3GPP access, and if the UE is in the CM-CONNECTED state in non-3GPP access, and if the UEs are simultaneously registered through 3GPP and non-3GPP is accessed in the same PLMN, the network may trigger a Service Request procedure for 3GPP through non-3GPP access.

In this procedure, the SMF and UPF that are influenced are all under the control of the PLMN, which provide services to UEs. In case of home-routed roaming, the SMF and UPF of HPLMN are not involved.

FIG. 6 is a flow chart showing a Network-triggered Service Request procedure according to a first example of a second disclosure.

(1) If the UPF receives downlink data for a PDU session, and if AN tunnel information stored in the UPF for the PDU session does not exist, if notification has not been made previously by the SMF so as to prevent the UPF from buffering the downlink data, the UPF buffers the downlink data.

(2) The UPF transmits a Data Notification message (including PDU session ID, information identifying QFI, and DSCP) to the SMF.

When a first downlink data packet arrives, if the SMF has not previously notified the UPF not to transmit any data notification to the SMF (in this case, the subsequent steps are not performed), the UPF transmits a Data Notification message to the SMF.

If the UPF receives a downlink data packet for another QoS flow within the same PDU session, the UPF transmits another Data Notification message to the SMF.

If a policy differentiation feature is supported by the UPF and activated by the SMF for such N4 session, the UPF includes TOS (IPv4)/TC (IPv6) values and information for identifying QFI of a QoS flow for the DL data packet.

(2b) The SMF transmits a Data Notification Verification message to the UPF.

(3a) The SMF transmits Namf_Communication_N1N2MessageTransfer (SUPI, PDU session ID, N2 SM information (QoS profile, CN N3 tunnel information, S-NS-SAI), N2 information, ARP, paging policy indication, 5QI, effective area for DNN) to the AMF.

When receiving the Data Notification message, if the PDU session corresponds to LADN, and, based on a UE location report received from the AMF, if the SMF determines that the UE is located outside of a usage availability area of the LADN corresponding to the UE, the SMF does not trigger the notification. The SMF may notify the UPF, which has abandoned the downlink data for the PDU session and transmitted a Data Notification so that Data Notification messages are no longer provided.

Otherwise, the SMF determines whether or not to contact the AMF. The SMF does not contact the AMF in the following cases:
  if the SMF has previously received a notification specifying that the SMF cannot reach the UE; or
  if the UE can only reach Regulatory Prioritized Service, and if the PDU session is not for the Regulatory Prioritized Service.

The SMF determines an AMF, and the SMF calls (or invokes) a Namf_Communication_N1N2MessageTransfer to the AMF including a PDU session ID, which is received in step 2a.

While the SMF waits for a user plane connection to be activated, if the SMF receives an additional Data Notification message for the same PDU session, and if the received additional Data Notification message corresponds to a higher priority level (i.e., equivalent to an ARP priority level) as compared to the first Data Notification message for the PDU session, the SMF calls a new Namf_Communication_N1N2MessageTransfer.

While the SMF waits for the user plane connection to be activated, if the SMF receives an N11 message from a new AMF other than the AMF to which the SMF has called the Namf_Communication_N1N2MessageTransfer, the SMF calls another Namf_Communication_N1N2MessageTransfer to the new AMF.

When the SMF supports Paging Policy Differentiation, a 5QI related to the QFI in step 2a, a DNN, and a paging policy related to downlink data that has triggered the Data Notification message are included in the Namf_Communication_N1N2MessageTransfer.

Note 1: The AMF may receive a Request message inducing signaling to a UE/RAN from other network functions (e.g., Network-initiated Deregistration, SMF initiated PDU Session Modification). If the UE is in the CM-CONNECTED state, and if the AMF transports only an N1 message to the UE, the procedure continues from step 6 as described below.

(3b) The AMF responds to the SMF.

If the UE is in the CM-IDLE state in the AMF, and if the AMF can perform paging to the UE, and if the UE is in a state of being capable of responding to the AMF, a Namf_Communication_N1N2MessageTransfer Response message, which includes a Cause field indicating "Attempting to reach UE", is transmitted to the SMF. In this case, N2 SM information may be ignored (or disregarded) by the AMF, and, in this case, the SMF may have to re-transmit the N2 SM information.

If the UE is in the CM-CONNECTED state in the AMF, the AMF transmits a Namf_Communication_N1N2MessageTransfer response, which includes a Cause field indicating "N1/N2 transfer success", to the UE.

If the UE is in the CM-IDLE state, and if the AMF determines that the UE cannot respond to the paging, the AMF shall transmit a Namf_Communication_N1N2MessageTransfer response message to the SMF, or to one of the other network functions, from which the AMF has received a Request message in step 3a. Alternatively, the AMF may perform an asynchronous type communication and may store UE context based on the received message. When the asynchronous type communication is called, and if the UE is in the CM-CONNECTED state, the AMF initiates communication with the UE and the (R)AN.

If the AMF has determined that the UE cannot perform communication with the SMF (e.g., if a UE of a MICO mode or a UE being registered only to a non-3GPP access is in the CM-IDLE state), the AMF may reject the request from the SMF. If the SMF is not subscribed to a UE Reachability event, the AMF may include an indication, which indicates that the SMF does not need to transmit a DL Data Notification to the AMF, in the Reject message. The AMF stores a notification that SMF has been notified that the UE is unreachable.

If the UE is not in the MICO mode, and if the request made by the SMF is not for a Regulatory Prioritized Service, when the AMF detects that the UE is located in a non-allowed area (or unauthorized area), the AMF rejects the request made by the SMF and notifies to the SMF that the UE is reachable only for the Regulatory Prioritized Service. The AMF stores its notification to the SMF notifying that the UE is reachable only for the Regulatory Prioritized Service.

When the old AMF receives a Namf_Communication_N1N2MessageTransfer, and if a registration procedure having an AMF change is in process, the old AMF may reject the request along with an indication that the Namf_Communication_N1N2MessageTransfer has been temporarily rejected.

If the SMF receives a Namf_Communication_N1N2MessageTransfer response along with an indication that its request has been temporarily rejected, the SMF initiates a locally configured guard timer and waits for an N11 message to be received from a new second AMF. If the SMF receives an N11 message from the AMF, the SMF shall once again call the Namf_Communication_N1N2MessageTransfer (including Data Notification) to the AMF from which the SMF has received the N11 message. Otherwise, if the guard timer is expired, the SMF performs step 3a. If the SMF determines that control plane buffering is applied, the SMF shall request to the UPF to initiate downlink data PDU transport towards the SMF.

(3c) SMF responds to the UPF.

The SMF may notify user plane activation failure to the UPF.

When the SMF receives, from the AMF, an indication indicating that it is reachable or unreachable only for the Regulatory Prioritized Service, the SMF may perform one of the following according to the network policy.

Instruct UPF to suspend Data Notification transmission;

Instruct UPF to suspend buffering of DL data and to delete (or discard) buffered data;

Instruct UPF to suspend Data Notification transmission, to suspend buffering of DL data, and to delete (or discard) buffered data; or Instruct the UPF to refrain from sending an additional N11 message on the DL data to the AMF, while the UE is unreachable.

If the SMF receives, from the AMF, the indication indicating that the N11 message requested by the SMF has been temporarily rejected, the SMT may instruct the UPF to apply temporary buffering in accordance with the network policy.

(4a) In 3GPP access, if the UE is in the CM-CONNECTED state, and if the PDU session ID received from the SMF, in step 3a, is related to the 3GPP access, the AMF performs step 8 to step 16 in the UE-triggered Service Request procedure. A user plane connection for the PDU session may be activated (e.g., radio resource and N3 tunnel establishment) without transmitting a Paging message to the (R)AN node and UE. In step 8, the AMF does not send an NAS Service Accept message to the UE. The remaining procedure will be omitted.

(4b) In 3GPP access, if the UE is in the CM-IDLE state, and if the PDU session ID received from the SMF, in step 3a, is related to the 3GPP access, based on the local policy, even if the UE is in the CM-CONNECTED state for the non-3GPP access, the AMF may determine that the notification is to be performed through 3GPP access, and the Paging message may be transmitted to the RAN node(s) through 3GPP access.

If the UE is simultaneously registered to 3GPP access and non-3GPP access in the same PLMN, if the UE is in the CM-IDLE state for both 3GPP access and non-3GPP access, and if the PDU session is related to the non-3GPP access in step 3a, the AMF indicates (or marks) "non-3GPP access" to the Paging message through the 3GPP access and transmits the Paging message to the RAN node(s).

While the AMF waits for the UE response for the Paging Request message having a non-3GPP access type, if the AMF receives a Namf_Communication_N1N2MessageTransfer message from the SMF being related with the 3GPP access PDU session, the AMF indicates (or marks) the related access type as "both accesses" and transmits a new Paging Request message.

If the UE is capable of reaching an RM-REGISTERED state and a CM-IDLE state, the AMF transmits the Paging message (NAS ID for paging, Registration Area list, paging DRX length, Paging Priority indication, access related to PDU session) to RAN node(s) belonging to a registration area in which the UE is registered, and when the Paging message is received from the AMF, an NG-RAN node pages a UE after including an access related to the PDU session within the Paging message.

When supporting the Paging Policy Differentiation, a Paging Strategy may be configured in an AMF for a different combination of DNN, Paging Policy indication, ARP, and 5QI.

For an RRC deactivated state, the Paging Strategy may be configured of a different combination of Paging Policy indication, ARP, and 5QI in a (R)AN.

A Paging Priority indication is included only in the following cases.

If configuration is made by an operator, if the AMF receives an N11 message including an ARP value being related to priority services (e.g., MPS, MCS).

One Paging priority level may be used for multiple ARP values. The operation of mapping an ARP value to a Paging priority level (or level) is configured in accordance with an operator policy of the AMF and RAN.

According to the Paging priority indication, the (R)AN may have a higher priority over the paging of UEs.

While the AMF waits for a UE response for a Paging Request message that is transmitted without any Paging Priority indication, as configured by the operator, if the AMF receives an N11 message including an ARP value related to priority services (e.g., MPS, MCS), the AMF shall transmit another Paging message having an appropriate Paging Priority level.

The following may be included in a paging strategy:

paging retransmission scheme (e.g., how frequently the paging is repeated or with what time interval);

a step of determine whether or not to transmit the Paging message to the (R)AN nodes during the specific AMF high load conditions; and whether or not to apply sub-area based paging (e.g., targeting last known cell-ID or TA when performing the first paging, and performing re-transmission from all registered TAs when attempting the next paging).

Note 3: The settings of Paging Priority are independent from the Paging Strategy.

The AMF and the (R)AN may support additional paging optimization for reducing signaling load and network resources, which are used for successfully paging the UE, by using one or more of the following means:

by an AMF implementing a specific Paging Strategy (e.g., an N2 Paging message is transmitted to the (R)AN node, which has last served the UE (or provided service to the UE));

when the AMF transitions (or shifts) to the CM-IDLE state, information on a recommended cell, which is provided by the (R)AN and an NG-RAN node are considered. The AMF determines the (R)AN node(s) that are/is to be paged while considering the part related to the (R)AN node(s), and the AMF provides information on a recommended cell within the N2 Paging message to each (R)AN node.

when performing paging, the (R)AN considers information on Paging Attempt Count provided by the AMF.

If a UE radio capability for Paging information is available in the AMF, the AMF adds the UE radio capability for Paging information within the N2 Paging message to the (R)AN node.

If the information on the recommended cell for Paging and the (R)AN node exists in the AMF, the AMF shall consider the aforementioned information in order to determine the (R)AN node for paging, and the AMF may transparently deliver the information on the recommended cell to the (R)AN node.

The AMF may include Paging Attempt Count information in the N2 Paging message(s). The Paging Attempt Count information shall be the same for all (R)AN nodes selected by the AMF for paging.

(4c) [conditional] If the UE is simultaneously registered to 3GPP access and non-3GPP access in the same PLMN, if the UE is in the CM-CONNECTED state in 3GPP access, and if the PDU session ID is related to non-3GPP access in step 3a, the AMF may transmit a NAS Notification message including a PDU session ID to the UE through 3GPP access and may configure (or set up) a notification timer.

If the UE is simultaneously registered to 3GPP access and non-3GPP access in the same PLMN, if the UE is in the CM-CONNECTED state for the non-3GPP access and in the CM-IDLE state for the 3GPP access, and if the PDU session ID is related to 3GPP in step 3a, based on the local policy, the AMF may determine to send a notification to the UE through the non-3GPP access. In this case, the AMP transmits a NAS Notification message including a PDU session ID to the UE through the non-3GPP access and may configure (or set up) a notification timer.

(5) The AMF may transmit a Namf_EventExposure_Notify to the SMF.

The AMF supervises the Paging procedure by using the timer. If the AMF fails to receive the response to the Paging Request message from the UE, the AMF may apply additional paging according to a random applicable Paging Strategy, which is described in step 4b.

If the AMF fails to receive the response from the UE, unless the AMF recognizes an MM procedure, which is an ongoing procedure that prevents the UE from sending any response, the AMF will consider the UE as unreachable. And, accordingly, since an SM N2 message cannot be routed to the (R)AN, by calling (or invoking) a Namf_EventExposure_Notify, the AMF shall notify the UE Unreachability Notification to the SMF.

If the UE receives the Unreachability Notification, the SMF notifies the UPF.

(6) If the UE is in the CM-IDLE in the 3GPP access, if the UE receives a Paging request for a PDU session related to 3GPP access or both accesses, the UE initiates the UE-triggered Service Request procedure. In step 4a, the AMF calls a Nsmf_PDUSession_UpdateSMContext request to SMF(s) related to a PDU session, which is identified in the MM NAS Service Request message, with the exception for a PDU session ID that is included in the Namf_Communication_N1N2MessageTransfer in step 3a.

If the UE is in the CM-IDLE state in both the non-3GPP access and the 3GPP access, and if the UE receives a Paging request for a PDU session related to non-3GPP access, the UE may initiate the UE-triggered Service Request procedure. At this point, a list of Allowed PDU sessions is included through the 3GPP access.

If the UE is in the CM-IDLE state in the non-3GPP access and in the CM-CONNECTED state in the 3GPP access, if the UE receives a NAS Notification message including a PDU session related to the non-3GPP access, if it is allowed by the UE-triggered UE policy, the UE performs a Service Request procedure with the list of allowed PDU sessions, which may be reactivated through the 3GPP access. If the AMF fails to receive a NAS Service Request message before the notification timer is expired, the AMF may notify the SMF that, even though the AMF was capable of being connected to the UE, the AMF has rejected the connection in order to reactivate the PDU session. If the AMF receives a Service Request message from the UE through the non-3GPP access (e.g., due to the successful connection of the UE to the non-3GPP access), the AMF may stop the notification timer.

If the UE is in the CM-IDLE state in the 3GPP access and in the CM-CONNECTED state in the non-3GPP access, if the UE receives a NAS Notification message identifying a PDU session related to the 3GPP access through the non-3GPP access, the UE initiates the Service Request procedure when the 3GPP access is available (clause 4.2.3.2). If the AMF fails to receive a NAS Service Request message before the notification timer is expired, the AMF may page the UE through 3GPP access, or the AMF may notify to the SMF that the UE was incapable of reactivating the PDU session.

(7) The UPF transmits, to the UE, downlink data being buffered through the (R)AN node, which has performed the Service Request procedure.

If the procedure is triggered by the request of another network entity, which is described in step 3a, the network may transmit a downlink signal.

II-2. Second Example of the Second Disclosure: A Network-Triggered Service Request Procedure Hereinafter, only the parts that are different from the first example will be described. And, for the parts that are the same as the first example, the contents of the first example will be directly applied without modification.

If the SMF is triggered to transmit a second Namf_Communication_N1N2MessageTransfer message having a higher priority level than the priority level according to which a first Namf_Communication_N1N2MessageTransfer message was transmitted, the SMF transmit the new Namf_Communication_N1N2MessageTransfer message indicating the higher priority level to the AMF. If the SMF receives, from the UPF, an additional Indication message for a PDU session having the same priority level as the first Namf_Communication_N1N2MessageTransfer message or lower, or if the SMF transmits a second Namf_Communication_N1N2MessageTransfer message indicating the higher priority level and receives an additional Indication message from the UPF, the SMF may not transmit a new Namf_Communication_N1N2MessageTransfer message.

Figure 7:
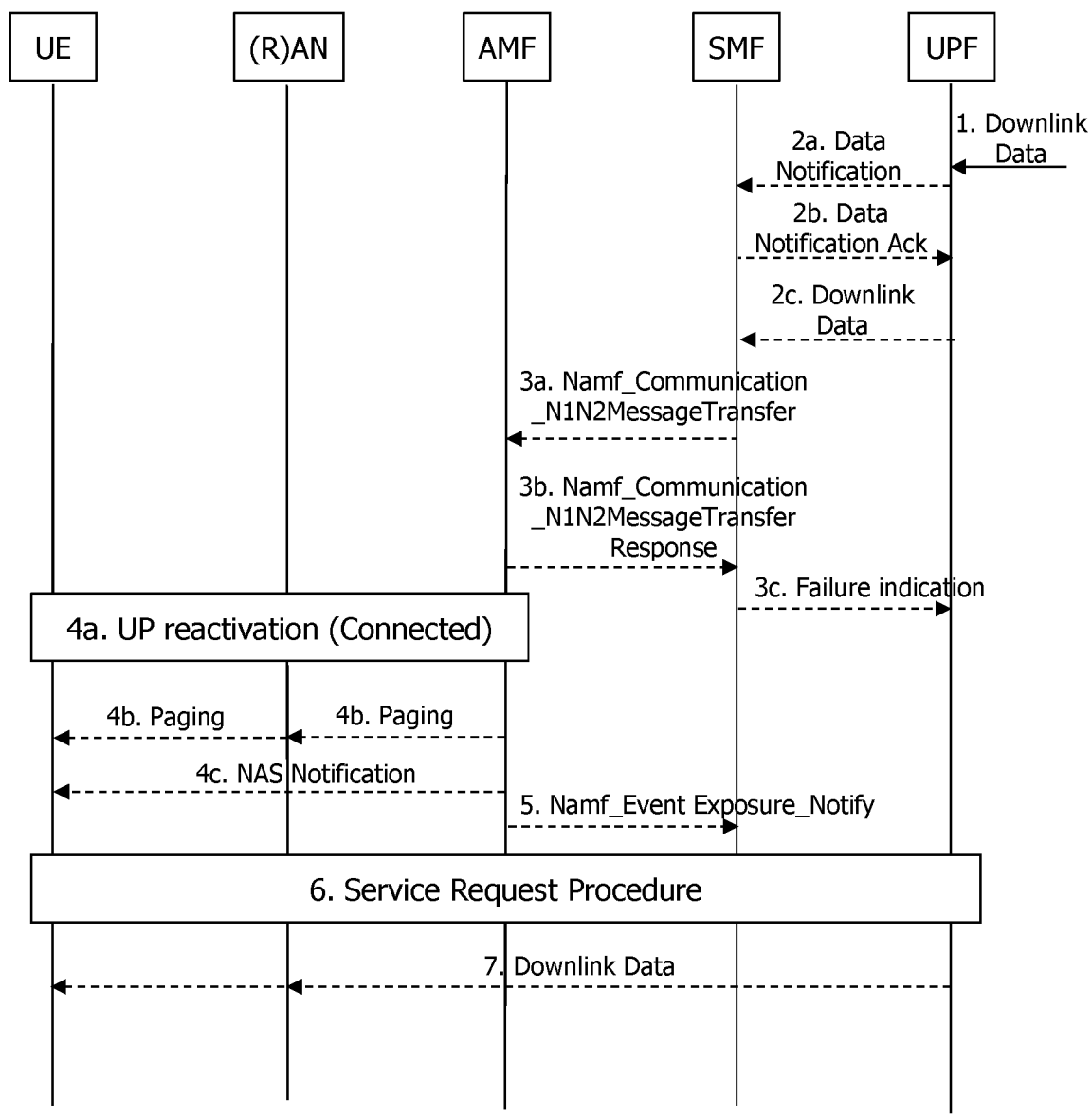
FIG. 7 is a flow chart showing a Network-triggered Service Request procedure according to a second example of the second disclosure.

FIG. 7 is a flow chart showing a Network-triggered Service Request procedure according to a second example of the second disclosure.

Hereinafter, only the parts that are different from the first example, which is described above with reference to FIG. 6, will be described. And, for the part that are the same as the first example, the contents of the first example, which is described above with reference to FIG. 6, will be directly applied without modification.

(1) If the UPF receives downlink data for a PDU session, and if AN tunnel information stored in the UPF for the PDU session does not exist, based on the command (or instruction) given by the SMF, the UPF buffers downlink data or delivers (or transports) the downlink data to the SMF.

(2c) The UPF delivers a downlink data packet to the SMF.

If a Paging Policy Differentiation feature is supported by the SMF, based on a TOS (IPv4)/TC (IPv6) value extracted from an IP header of the received downlink data packet, and also based on information for identifying QFI of a QoS flow for the downlink data packet, the SMF determines a Paging Policy indication.

(3c) SMF responds to the UPF.

The SMF may notify user plane activation failure to the UPF.

When the SMF receives, from the AMF, an indication indicating that it can be reached only for the Regulatory Prioritized Service or cannot be reached, the SMF may perform one of the following according to the network policy.

Instruct UPF to suspend Data Notification transmission;
Instruct UPF to suspend buffering of DL data and to delete (or discard) buffered data;
Instruct UPF to suspend Data Notification transmission, to suspend buffering of DL data, and to delete (or discard) buffered data; or
Instruct the UPF to restrain from sending an additional N11 message on the DL data to the AMF, while the UE is unreachable.

Based on a Service Provider policy, the SMF may suspend the Fee-Charging procedure.

If the SMF receives a message notifying that the Namf_Communication_N1N2MessageTransfer message requested by the AMF has been temporarily rejected, according to the Network policy, the SMF may instruct the UPF to apply temporary buffering.

(4b) In 3GPP access, if the UE is in the CM-IDLE state, and if the PDU session ID received from the SMF, in step 3a, is related to the 3GPP access, based on the local policy, even if the UE is in the CM-CONNECTED state for the non-3GPP access, the AMF may determine that the notification is to be performed through 3GPP access, and the Paging message may be transmitted to the RAN node(s) through 3GPP access.

If the UE is simultaneously registered to 3GPP access and non-3GPP access in the same PLMN, if the UE is in the CM-IDLE state for both 3GPP access and non-3GPP access, and if the PDU session is related to the non-3GPP access in step 3a, the AMF indicates (or marks) "non-3GPP access" to the Paging message through the 3GPP access and transmits the Paging message to the RAN node(s).

If the UE is simultaneously registered to 3GPP access and non-3GPP access in the same PLMN, the UE is in the CM-IDLE state for both 3GPP access and non-3GPP access, and the AMF receives multiple requests related to the 3GPP access and non-3GPP access. At the same time, the AMF transmits a Paging message having a related access "non-3GPP" to the RAN node(s) through 3GPP access.

If the UE is capable of reaching an RM-REGISTERED state and a CM-IDLE state, the AMF transmits the Paging message (NAS ID for paging, Registration Area list, paging DRX length, Paging Priority indication, access related to PDU session) to RAN node(s) belonging to a registration area in which the UE is registered, and when the Paging message is received from the AMF, an NG-RAN node pages a UE after including an access related to the PDU session within the Paging message.

While the AMF waits for the UE response for the Paging Request message for a 3GPP access PDU session, if the AMF receives a Namf_Communication_N1N2MessageTransfer message having a PDU session ID related to non-3GPP access, the AMF shall wait until the UE is CM-CONNECTED, and the AMF may transmit, to the UE, a NAS Notification message including a PDU session ID related to non-3GPP access through 3GPP access.

While the AMF waits for the UE response for the Paging Request message for a non-3GPP access PDU session, if the AMF receives a Namf_Communication_N1N2MessageTransfer message having a PDU session ID related to 3GPP access, the AMF shall wait until the UE is CM-CONNECTED, and the AMF performs activation of UP connection for the PDU session related to 3GPP access.

When supporting the Paging Policy Differentiation, a Paging Strategy may be configured in an AMF for a different combination of DNN, Paging Policy indication, ARP, and 5QI.

For an RRC deactivated state, the Paging Strategy may be configured of a different combination of Paging Policy indication, ARP, and 5QI in a (R)AN.

A Paging Priority indication is included only in the following cases.

If configuration is made by an operator, if the AMF receives a Namf_Communication_N1N2MessageTransfer message including an ARP value being related to a Priority Service (e.g., MPS, MCS).

One Paging priority level may be used for multiple ARP values. The operation of mapping an ARP value to a Paging priority level (or level) is configured in accordance with an operator policy of the AMF and RAN.

According to the Paging priority indication, the (R)AN may have a higher priority over the paging of UEs.

While the AMF waits for a UE response for a Paging Request message that is transmitted without any Paging Priority indication, as configured by the operator, if the AMF receives a Namf_Communication_N1N2MessageTransfer message including an ARP value related to a Priority service (e.g., MPS, MCS), the AMF shall transmit another Paging message having an appropriate Paging Priority level.

The following may be included in a paging strategy:
paging retransmission scheme (e.g., how frequently the paging is repeated or with what time interval);
a step of determine whether or not to transmit the Paging message to the (R)AN nodes during the specific AMF high load conditions; and
whether or not to apply sub-area based paging (e.g., targeting last known cell-ID or TA when performing the first paging, and performing re-transmission from all registered TAs when attempting the next paging).

(6) If the UE is in the CM-IDLE in the 3GPP access, if the UE receives a Paging request for a PDU session related to 3GPP access or both accesses, the UE initiates the UE-triggered Service Request procedure. In step 4a, the AMF calls a Nsmf_PDUSession_UpdateSMContext request to SMF(s) related to a PDU session, which is identified in the MM NAS Service Request message, with the exception for a PDU session ID that is included in the Namf_Communication_N1N2MessageTransfer in step 3a.

If the UE is in the CM-IDLE state in both the non-3GPP access and the 3GPP access, and if the UE receives a Paging request for a PDU session related to non-3GPP access, the UE may initiate the UE-triggered Service Request procedure. At this point, a list of Allowed PDU sessions is included through the 3GPP access.

If there is no PDU session that can be reactivated through the 3GPP access, the UE includes the list of allowed PDU sessions as an empty list. As described above, if the AMF receives a Service Request message from the UE through the non-3GPP access (e.g., due to the successful connection of the UE to the non-3GPP access), the AMF may suspend the Paging procedure and process the received Service Request. If the AMF receives the Service Request message, and if the list of allowed PDU sessions, which is provided by the UE, does not include the PDU session by which the UE was paged, the AMF notifies the SMF that reactivation was not accepted even though the UE was reachable by calling a Namf_EventExposure_Notify service.

II-3. Third Example: SERVICE REQUEST Message

A SERVICE REQUEST message being transmitted by the UE to an SMF may include the following information.

TABLE 3

Information element (IE)
Extended protocol discriminator
Security header type
Service type
5G-TMSI
Service request message identity
ngKSI TABLE 3-continued Spare half octet
Uplink data status
PDU session status
Allowed PDU session status In the table presented above, the Uplink data status is included, if the UE has uplink user data that is to be transmitted.

The PDU session status indicates an activated PDU session within the UE.

The Allowed PDU session status is included, if a Service Request message is transmitted as a Paging message or notification through 3GPP access for a PDU session being related to non-3GPP access, and if the UE sends a response to the transmitted Service Request message.

The Allowed PDU session status is includes a list of allowed PDU sessions.

If the UE receives a Paging message transmission for non-3GPP access, the UE is configured to transmit a list of Allowed PDU Sessions only if PDU sessions that can be transferred (or shifted) to 3GPP access exist. Therefore, in a case where the PDU sessions cannot all be transferred (or shifted) to 3GPP access, the above-described information is/are not required to be included. However, if the list of Allowed PDU Sessions is to be transmitted as an empty list according to the method proposed in the disclosure of this specification, the following methods (or schemes) may be used.

1. A scheme of setting all PDU session identifier (PSI) bits included in the Allowed PDU session status IE to zero (0)

TABLE 4

| 8 | 7 | 6 | 5 | 4 | 3 | 2 | 1 | |
|---|---|---|---|---|---|---|---|---|
| Allowed PDU session status IEI | | | | | | | | octet 1 |
| Length of Allowed PDU session status contents = 4byte | | | | | | | | octet 2 |
| 0 | 0 | 0 | 0 | 0 | 0 | 0 | 0 | octet 3 |
| 0 | 0 | 0 | 0 | 0 | 0 | 0 | 0 | octet 4 |

2. A scheme of setting a Length field included in the Allowed PDU session status IE to 2 bytes and then not sending the PSI part

TABLE 5

| 8 | 7 | 6 | 5 | 4 | 3 | 2 | 1 | |
|---|---|---|---|---|---|---|---|---|
| Allowed PDU session status IEI | | | | | | | | octet 1 |
| Length of Allowed PDU session status contents = 2byte | | | | | | | | octet 2 |

Accordingly, a lowest (or minimum) length of the IE may be 2 bytes (i.e., 2 octets) and not 4 bytes.

3. A scheme that does not include the Allowed PDU session status IE and sending, through a separate IE, an indication indicating that the Allowed PDU session status is empty A SERVICE REQUEST message shall include information elements as shown below.

TABLE 6

Information element (IE)
Extended protocol discriminator
Security header type
Service type
5G-TMSI TABLE 6-continued Service request message identity
ngKSI
Spare half octet
Uplink data status
PDU session status
Allowed PDU session status
Empty Allowed PDU session status Indication The aforementioned Empty Allowed PDU session status Indication may also be interpreted as an indication indicating that performing the reactivation through the 3GPP access denotes that there is no allowed PDU session. Additionally/alternatively, the Empty Allowed PDU session status Indication (or another type of IE) may also be interpreted as an indication indicating the transmission of a Paging message for non-3GPP access or a response to the NAS Notification message.

4. A scheme in which a combination of the aforementioned Scheme 2 and Scheme 3 is included and transmitted II-4. Fourth Example: Types of 5GMM Procedures Depending upon how it is initiated (or started), three different types of 5GMM procedures may be differentiated, as listed below.

a) 5GMM Common procedure

The 5GMM Common procedure may also be initiated (or started) when the UE is in a 5GMM-CONNECTED mode. The procedure belonging to this type is as listed below.

1) Network-initiation:
i) Network-initiated NAS transmission
ii) Primary Authentication and Key Agreement procedure
iii) Security Mode control
iv) General UE configuration update
v) Identification
2) UE-initiation
UE-initiated NAS transmission
3) Initiated by UE or network and used for reporting Specific Error Status detected when receiving 5GMM Protocol Data
5GMM status b) 5GMM Specific procedure:

Only one 5GMM Specific procedure may be performed for each access network where the UE is camping. The procedure belonging to this type is as listed below.

1) The procedure is UE-initiated and may be used, for example, as follows. A UE is registered to a network for a 5GS service, and a 5GMM context is configured so as to update UE location/parameter(s).

Registration

This is UE-initiated or network-initiated and is used for cancelling (or deregistering) the network registration for 5GS service and for releasing the 5GMM context.

Deregistration c) 5GMM Connection Management procedure:

1) This is UE-initiated and used for configuring security connection for the network or for requesting resource reservation for data transmission or for both.

Service Request

The Service Request procedure may be initiated (or started) if there is not 5GMM Specific procedure, which is initiated for each network access where the UE is camping.

2) This is network-initiated and may be used for requesting configuration of an N1 NAS signaling connection, or for performing re-registration when needed as a result of a network failure, or for requesting a reactivation of a PDU session for non-3GPP through a 3GPP access; however, this cannot be applied to a non-3GPP access network:

Paging

3) This is network-initiated by the network and used for requesting Reactivation, when the UE in a 5GMM-CONNECTED mode through a 3GPP access or non-3GPP access: Notification II-5. Fifth Example: Initiation of the Service Request Procedure By transmitting a SERVICE REQUEST message to the AMF, the UE initiates (or starts) the Service Request procedure and starts timer T3517.

In case of 'Case a' of Subclause 5.6.1.1 of Document TS 24.501
  If a Paging Request includes an indication for a non-3GPP access type, an Allowed PDU Session Status IE is included in the Service message in order to allow the UE to indicate whether or not User Plane Resource Activation is available (or possible) in 3GPP access. This is included even if there is no PDU session that can be activated to the 3GPP access.
  If the UE has uplink user data that is waiting to be transmitted, an Uplink user data status IE is included in a SERVICE REQUEST message in order to allow the UE to indicate a PDU session that is to transmit pending user data; or
otherwise, the Uplink user data status IE shall not be included in the SERVICE REQUEST message.

In case of 'Case b' of Subclause 5.6.1.1 of Document TS 24.501
An Allowed PDU Session Status IE shall be included in a SERVICE REQUEST message in order to allow the UE to indicate whether or not a user plane resource of the PDU session can be reactivated through the 3GPP access. This shall be included even if there is no PDU session that can be reactivated through the 3GPP access.

In case of 'Case c' and 'Case f' of Subclause 5.6.1.1 of Document TS 24.501
An Uplink data status IE shall not be included in a SERVICE REQUEST message.

In case of 'Case d' and 'Case e' of Subclause 5.6.1.1 of Document TS 24.501
An Uplink data status IE is included in a SERVICE REQUEST message in order to allow the UE to indicate a PDU session that is to transmit pending user data.

In case of 'Case g' of Subclause 5.6.1.1 of Document TS 24.501
If the UE has uplink user data that is waiting to be transmitted, an Uplink data status IE is included in a SERVICE REQUEST message in order to allow the UE to indicate PDU session(s) that is/are to have pending user data.

In case of 'Case h' of Subclause 5.6.1.1 of Document TS 24.501
If the UE receives an Emergency Service Request from a higher layer and performs an emergency service fallback (Subclause 4.13.4.2 of 3GPP TS 23.502), the UE may set up (or configure) the SERVICE REQUEST message service type as an "emergency service fallback".

The PDU session status information element (IE) may be included in the SERVICE REQUEST message in order to indicate PDU session(s) that is/are available to the UE. If the PDU session status information element (IE) is included in the SERVICE REQUEST message, the AMF may locally release (without any peer-to-peer signaling between the UE and the network) all PDU session contexts, which are indicated, by the UE, to be in an active state within the AMF, whereas the AMF is indicated, by the UE, as being in an inactive state.

II-6. Sixth Example: Service Request Procedure being Accepted by the Network

If the AMF needs to synchronize the PDU session status, or if the PDU session status IE is included in the SERVICE REQUEST message, the AMF shall include a PDU session status IE in a SERVICE ACCEPT message in order to indicate which PDU session is activated in the AMF. If the PDU session status IE is included in the SERVICE ACCEPT message, the AMF may locally release (without any peer-to-peer signaling between the network and the UE) all PDU sessions, which are activated by the UE, whereas the AMF is in the inactive state.

When the UE is located outside of an LADN service area, and if the UE initiates a service request procedure for the PDU session corresponding to the LADN, the AMF may include a Reject cause in a Service Reject message. The Reject cause indicates that the PDU session is not activated due to an LADN, which is unavailable for usage in a PDU session reactivation result IE.

If an Uplink data status IE is included in the SERVICE REQUEST message, the AMF shall perform the following steps:

a) instruct an SMF to reactivate a user-plane resource for the corresponding PDU session context; and b) include a PDU session reactivation result IE in the SERVICE ACCEPT message in order to indicate a user-plane reactivation result of a PDU session, which was requested to be reactivated by the UE.

If an Allowed PDU Session Status IE is included in the SERVICE REQUEST message, and if at least one PDU session may be reactivated through the 3GPP access, the AMF may perform the following steps:

a) notify that the user-plane resource is to be reactivated to the SMF, which indicates downlink data that can be reactivated through the 3GPP access and that is pending;

b) notify that the reactivation of the user-plane resource for the corresponding PDU session context cannot be performed to the SMF, which indicates pending downlink data, if the downlink data cannot be reactivated through the 3GPP access; and c) include a PDU session reactivation result IE in a SERVICE ACCEPT message in order to indicate the PDU session context that is successfully reactivated.

If the SERVICE REQUEST message is for an emergency service replacement, the AMF triggers an emergency service fallback procedure.

II-7. Seventh Example: Allowed PDU Session Status

If a SERVICE REQUEST message is transmitted as a response to a paging or notification related to the non-3GPP access, this IE shall be included even if there is no PDU session that can be activated through the 3GPP access.

The purpose (or object) of the Allowed PDU Session Status IE is to notify the network of a PDU session related to the non-3GPP access that can reactivate the user plane resource through the 3GPP access. This IE shall be included even if there is no PDU session that can be reactivated through the 3GPP access.

The Allowed PDU Session Status is a Type-4 information IE having a minimum length of 4 octets and a maximum length of 34 octets.

The following table includes Allowed PDU session status IE.

TABLE 7

| 8 | 7 | 6 | 5 | 4 | 3 | 2 | 1 | |
|---|---|---|---|---|---|---|---|---|
| Allowed PDU session status IEI | | | | | | | | octet 1 |
| Length of Allowed PDU session status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | |
| Spare | | | | | | | | octet 5*-34* |

The following table shows the Allowed PDU session status IE.

TABLE 8

PSI(x) shall be coded as follows:
PSI(0) - PSI(4):
Bits 1 to 5 of octet 3 are spare and shall be coded as zero.
PSI(5) - PSI(15):
0 indicates that the user-plane of corresponding PDU session is not allowed to be reactivated over 3GPP access.
1 indicates that the user-plane resources of corresponding PDU session can be reactivated over 3GPP access.
If there is no PDU session can be reactivated over 3GPP access, all bits in PSI(5) - PSI(15) shall be coded as zero. All bits in octet 5 to 34 are spare and shall be coded as zero, if the respective octet is included in the information element.

The above-described embodiments may be implemented by hardware. The description of the same will be provided with reference to the accompanying drawings.

Figure 8:
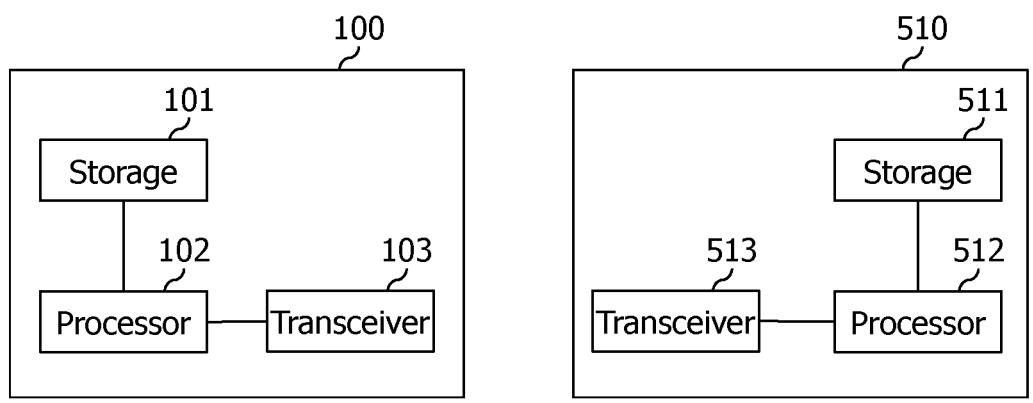
FIG. 8 is a block diagram illustrating a configuration of a UE and a network according to an embodiment of the present disclosure.

FIG. 8 is a block diagram illustrating a configuration of a UE and a network according to an embodiment of the present disclosure.

As shown in FIG. 8, the UE 100 includes a storage unit 101, a controller 102, and a transceiver 103. Further, the network node may include one of an AMF, an SMF, an NEF, and an AF. The network node may include a storage unit 511, a controller 512, and a transceiver 513.

The storage units store the above-described method.

The controllers control the storage units and the transceivers, respectively. In detail, the controllers execute the above methods stored in the storage units, respectively. Further, the controllers transmit the above signals through the transceiver.

The specification presented above has been described based on an example of a preferred embodiment of the present disclosure. However, since the scope of the present disclosure will not be limited only to a specific embodiment, as described above, it shall be understood that the present disclosure may be modified, varied, or enhanced to various forms without departing from the scope and spirit of the present disclosure, which are set forth herein.

What is claimed is:

1. An operation method of a user equipment (UE), the method comprising:

performing, by the UE, a registration procedure over a 3rd generation partnership project (3GPP) access and a non-3GPP access in a same Public Land Mobile Network (PLMN);

receiving, by the UE from an Access and Mobility Management Function (AMF) node, a paging message while in an idle state in both of the 3GPP access and the non-3GPP access, wherein the paging message includes access type information informing that the paging message is originated due to a protocol data unit (PDU) session over the non-3GPP access; and transmitting, by the UE, a service request message including a list of allowed PDU sessions, upon receiving the paging message, wherein based on that there is no PDU session to be reactivated over the 3GPP access, the service request message includes an empty list of allowed PDU sessions, and wherein all bits of PDU session identifiers (PSIs) in the empty list of the allowed PDU sessions are coded as zero (0).

2. The method of claim 1, wherein the empty list of the allowed PDU sessions including no PSI is used for the AMF to notify a session management function (SMF) that the UE was reachable but did not accept to reactive the PDU session.

3. The method of claim 1, wherein based on that the PDU session over the non-3GPP access is to be reactivated over the 3GPP access, the service request message includes the list of the allowed PDU sessions which includes a PSI of the PDU session.

4. A user equipment (UE), the UE comprising:

a transceiver; and a processor configured to control the transceiver, wherein the processor performs a registration procedure over a 3rd generation partnership project (3GPP) access and a non-3GPP access in a same Public Land Mobile Network (PLMN), wherein the processor receives, through the transceiver from an Access and Mobility Management Function (AMF) node, a paging message while in an idle state in both of the 3GPP access and the non-3GPP access, wherein the paging message includes access type information informing that the paging message is originated due to a protocol data unit (PDU) session over the non-3GPP access, wherein the processor transmits, through the transceiver, a service request message including a list of allowed PDU sessions, upon receiving the paging message, wherein based on that there is no PDU session which is to be reactivated over the 3GPP access, the service request message includes an empty list of allowed PDU sessions, and wherein all bits of PDU session identifiers (PSIs) in the empty list of the allowed PDU sessions are coded as zero (0).

5. The UE of claim 4, wherein the empty list of the allowed PDU sessions including no PSI is used for the AMF to notify a session management function (SMF) that the UE was reachable but did not accept to reactive the PDU session.

6. The UE of claim 4, wherein, based on that the PDU session over the non-3GPP access is to be reactivated over the 3GPP access, the service request message includes the list of the allowed PDU sessions which includes a PSI of the PDU session.

7. An operation method of an access and mobility management function (AMF) node, the method comprising:
- transmitting a paging message for a user equipment (UE),
- wherein the UE is registered in both of a 3rd generation partnership project (3GPP) access and a non-3GPP access in a same Public Land Mobile Network (PLMN),
- wherein the UE is in an idle state in the both of the 3GPP access and the non-3GPP access, and
- wherein the paging message includes an access type information informing that the paging message is originated due to a protocol data unit (PDU) session over the non-3GPP access; and
- receiving, from the UE, a service request message including a list of allowed PDU sessions, upon the UE receiving the paging message,
- wherein based on that the service request message includes an empty list of allowed PDU sessions, there is no PDU session which is to be reactivated over the 3GPP access, and
- wherein all bits of PDU session identifiers (PSIs) in the empty list of the allowed PDU sessions are coded as zero (0).

8. The method AMF node of claim 7, further comprising:
- notifying a session management function (SMF) that the UE was reachable but did not accept to reactive the PDU session, based on the empty list of the allowed PDU sessions including no PSI.

9. An access and mobility management function (AMF) node, the AMF node comprising:
- a transceiver; and
- a processor operably coupled to the transceiver,
- wherein the processor is configured to control the transceiver to transmit a paging message for a user equipment (UE),
- wherein the UE is registered in both of a 3rd generation partnership project (3GPP) access and a non-3GPP access in a same Public Land Mobile Network (PLMN),
- wherein the UE is in an idle state in the both of the 3GPP access and the non-3GPP access, and
- wherein the paging message includes an access type information informing that the paging message is originated due to a protocol data unit (PDU) session over the non-3GPP access;
- wherein the processor is configured to control the transceiver to receive, from the UE, a service request message including a list of allowed PDU sessions, upon the UE receiving the paging message,
- wherein based on that the service request message includes an empty list of allowed PDU sessions, there is no PDU session which is to be reactivated over the 3GPP access, and
- wherein all bits of PDU session identifiers (PSIs) in the empty list of the allowed PDU sessions are coded as zero (0).

* * * * *